United States Patent [19]
Struble

[11] Patent Number: 5,551,162
[45] Date of Patent: Sep. 3, 1996

[54] HAND-HELD GAP AND CONTOUR MEASURING GAUGE

[75] Inventor: James E. Struble, Eaton Rapids, Mich.

[73] Assignee: JS Research and Development, Inc., Eaton Rapids, Mich.

[21] Appl. No.: 321,969

[22] Filed: Oct. 12, 1994

[51] Int. Cl.$^6$ ........................................................ G01B 7/14
[52] U.S. Cl. ............................ 33/548; 33/544.4; 33/546; 33/613
[58] Field of Search ...................... 33/1 N, 1 PT, 33/187, 194, 501.05, 533, 542, 544.4, 546, 548, 551, 552, 556, 557, 558, 559, 560, 600, 613, 645, 783, 784, 832, 833

[56] References Cited

U.S. PATENT DOCUMENTS

| | | | |
|---|---|---|---|
| 3,733,704 | 5/1973 | Farabaugh | 33/552 |
| 3,855,708 | 12/1974 | Tann et al. | 33/558 |
| 4,221,053 | 9/1980 | Bobel, II et al. | 33/558 |
| 4,265,026 | 5/1981 | Meyer | 33/542 |
| 4,314,406 | 2/1982 | Barnes | 33/169 B |
| 4,345,380 | 8/1982 | Vis | 33/784 |
| 4,473,952 | 10/1984 | Mariani | 33/542 |
| 4,606,129 | 5/1986 | Barrowman et al. | 33/613 |
| 4,731,935 | 3/1988 | Struble | 33/560 |

FOREIGN PATENT DOCUMENTS

| | | | |
|---|---|---|---|
| 1091817 | 4/1955 | France | 33/544.4 |
| 1538021 | 1/1990 | U.S.S.R. | 33/544.4 |

Primary Examiner—William A. Cuchlinski, Jr.
Assistant Examiner—G. Bradley Bennett
Attorney, Agent, or Firm—MacMillan, Sobanski & Todd

[57] ABSTRACT

A device for measuring the gap between the opposed facing surfaces of two adjacent parts, and simultaneously measuring the contour between outwardly facing surfaces of the parts. The device is preferably hand-held, and has a main body with a gap measuring element supported relative to the main body. The gap measuring element is mounted to be moveable along a first path relative to a first reference member carried by the main body. The first reference member is selectively engagable with one of the parts. The gap measuring element is insertable into the gap for engagement with the other of the parts. The gap measuring element is coupled to a transducer for generating a signal representative of the relative position of the gap measuring element along its path. The signal is proportional to the gap between the opposed facing surfaces of the parts. A contour measuring element is also supported relative to the main body. The contour measuring element is mounted to be moveable along a second path relative to a second reference member carried by the main body. The second reference member is selectively engagable with the outwardly facing surface one of the first and second parts. The contour measuring element is engagable with the outwardly facing surface of the other of the first and second parts. The contour measuring element is coupled to a transducer for generating a signal representative of the relative position of the contour element along the path.

26 Claims, 13 Drawing Sheets

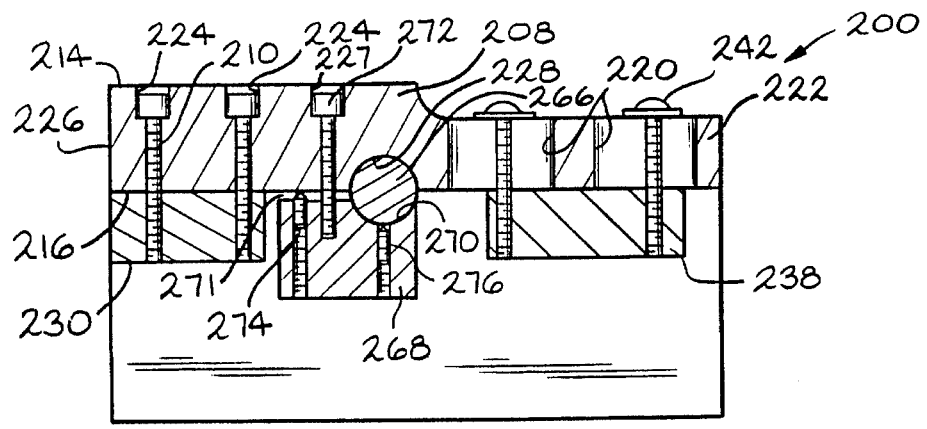
FIG. 19
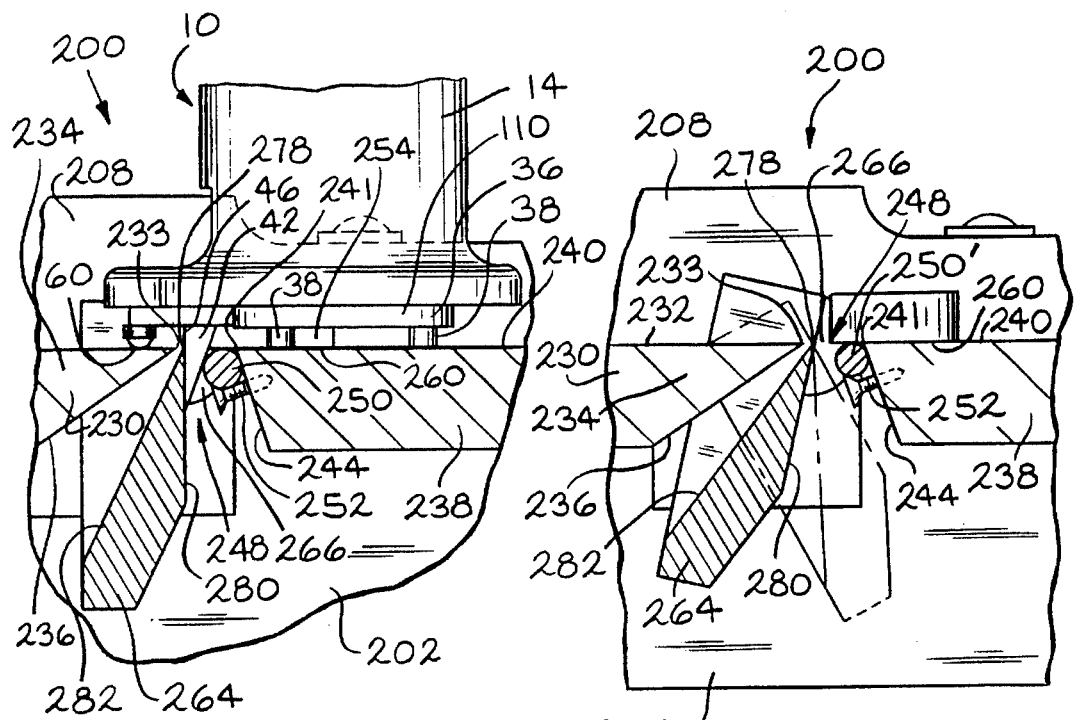
FIG. 20
FIG. 21

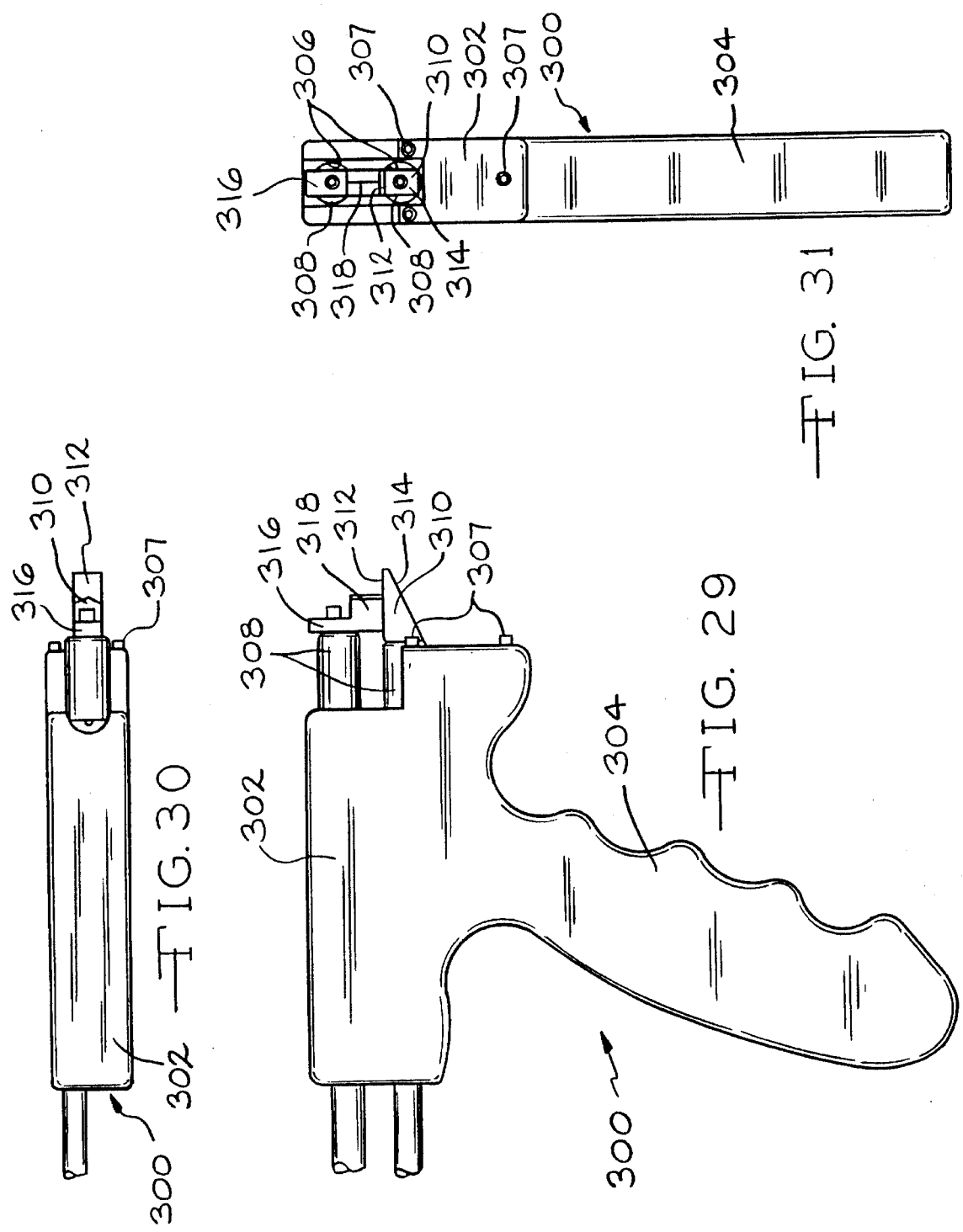

HAND-HELD GAP AND CONTOUR MEASURING GAUGE

BACKGROUND OF THE INVENTION

This invention relates in general to measuring instruments and in particular to hand-held transducer gauge devices for taking contour (flushness) and gap measurement readings of two adjacent parts.

In manufacturing operations there is often a need to measure the gap between two adjacent parts as well as to measure the flushness or contour of surfaces of the parts in order to inspect the effect of previous manufacturing operations, or to insure the proper position of one part relative to another. For example, it may be desirable to cheek the installation of the hood on an automobile by checking, at various locations, the gap between the hood and the adjacent fender of the automobile. Additionally, it may be desirable to measure the vertical alignment of the hood with the adjacent fender of the automobile, to ensure hood is flush with the adjacent portion of the fenders. Such a measurement of flushness is also known as a contour measurement.

A variety of gauging devices are available for making these measurements, ranging in complexity from a handheld ruler to automatic probes controlled by servo-systems and providing digital outputs of their measured positions.

SUMMARY OF THE INVENTION

This invention relates to a device for measuring the gap between the opposed facing surfaces of two adjacent parts, and simultaneously measuring the contour between outwardly facing surfaces of the parts. The device is preferably hand-held, and has a main body with a gap measuring element supported relative to the main body. The gap measuring element is mounted to be moveable along a first path relative to a first reference member earned by the main body. The first reference member is selectively engagable with one of the parts. The gap measuring element is insertable into the gap for engagement with the other of the parts. The gap measuring element is coupled to a transducer for generating a signal representative of the relative position of the gap measuring element along its path. The signal is proportional to the gap between the opposed facing surfaces of the parts. In a preferred embodiment the gap measuring element is wedge-shaped and engages both of the opposed facing surfaces while the first reference member engages an outwardly facing surface of one of the parts.

A contour measuring element is also supported relative to the main body. The contour measuring element is mounted to be moveable along a second path relative to a second reference member carried by the main body. The second reference member is selectively engagable with the outwardly facing surface of one of the first and second parts. The contour measuring element is engagable with the outwardly facing surface of the other of the first and second parts. The contour measuring element is coupled to a transducer for generating a signal representative of the relative position of the contour element along the path, the signal being proportional to the contour of the adjacent outwardly facing surfaces.

A zero block which may be used to prepare the measuring device for taking gap and contour measurements will preferably include provisions for forming an adjustable gap, varying the angle between two faces thereof, and varying the radius at an edge of the gap.

Various objects and advantages of this invention will become apparent to those skilled in the art from the following detailed description of the preferred embodiment, when read in light of the accompanying drawings.

BRIEF DESCRIPTION OF THE DRAWINGS

FIG. 19 is a vertical sectional view of the zero block taken along the lines 19—19 of FIG. 14.

FIG. 20 is an enlarged partial vertical sectional view of the zero block with the measuring device of FIG. 1 positioned thereon to take gap and contour measurements.

FIG. 21 is an enlarged partial vertical sectional view of the zero block illustrating the adjustable face angle and adjustable radius features thereof.

FIG. 29 is a side view of another embodiment of a hand-held gap and contour measuring device according to the invention.

FIG. 30 is a top view of the measuring device illustrated in FIG. 29.

FIG. 31 is an end view of the measuring device illustrated in FIG. 29.

DETAILED DESCRIPTION OF THE PREFERRED EMBODIMENT

Figure 1:
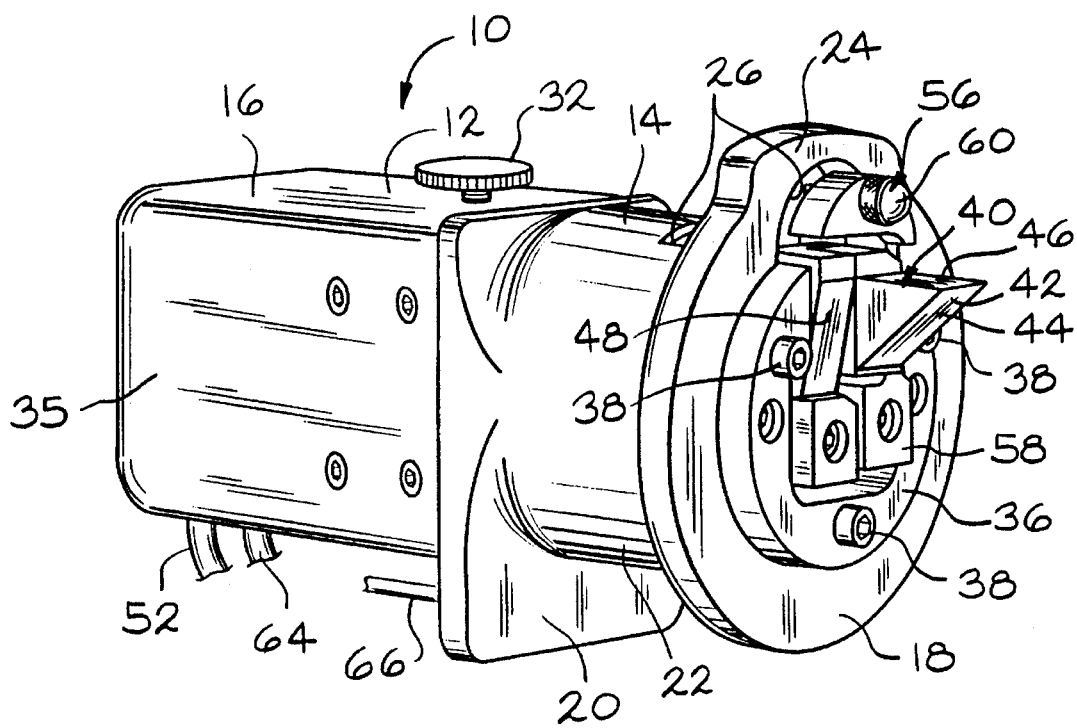
FIG. 1 is a perspective view of a hand-held gap and contour measuring device according to the invention.
Figure 2:
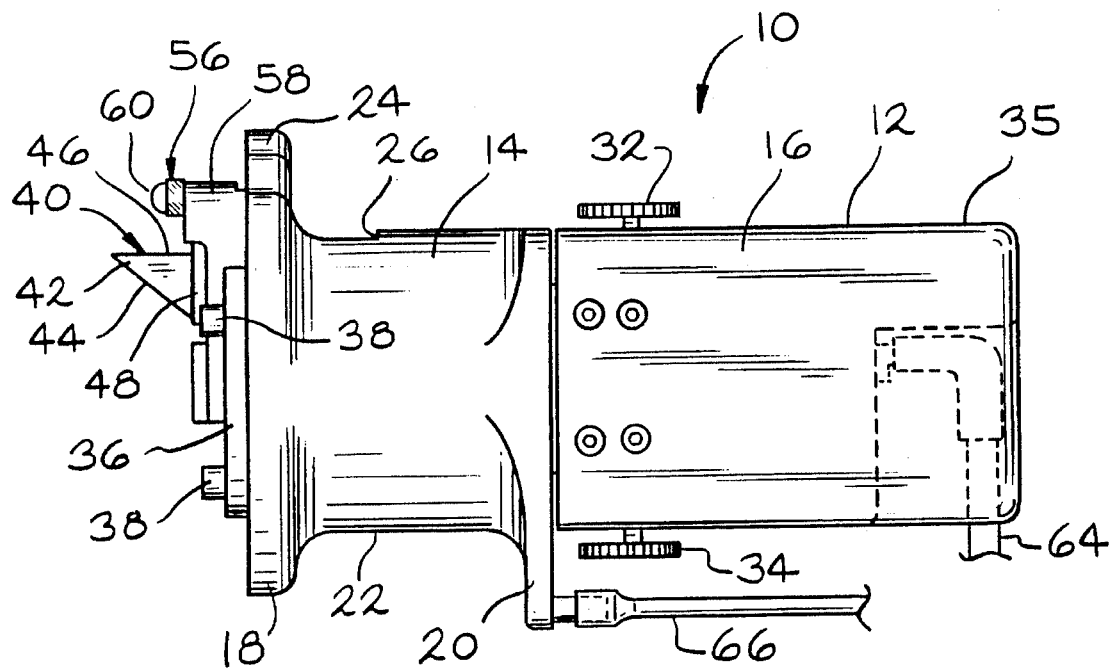
FIG. 2 is a side view of the measuring device illustrated in FIG. 1.
Figure 3:
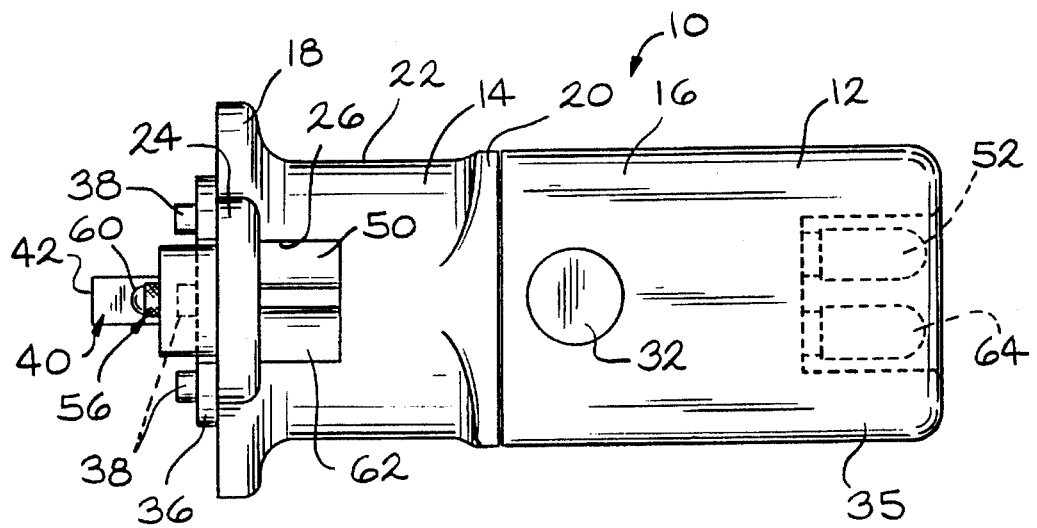
FIG. 3 is a top view of the measuring device illustrated in FIG. 1.
Figure 4:
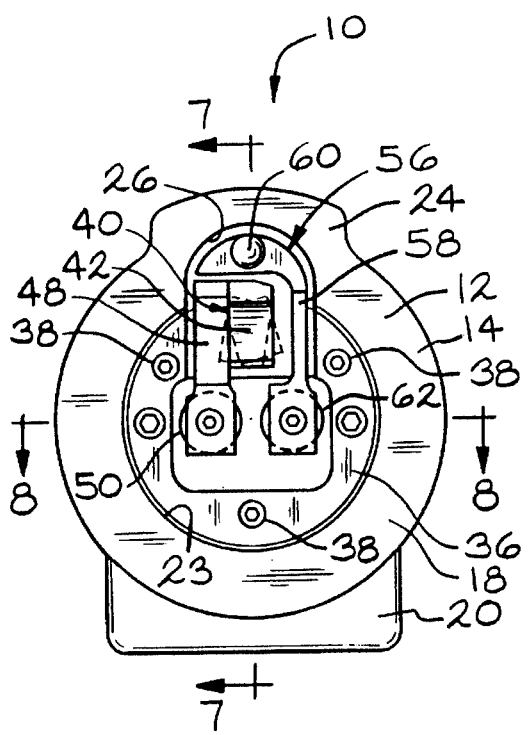
FIG. 4 is a first end view of the measuring device illustrated in FIG. 1.
Figure 5:
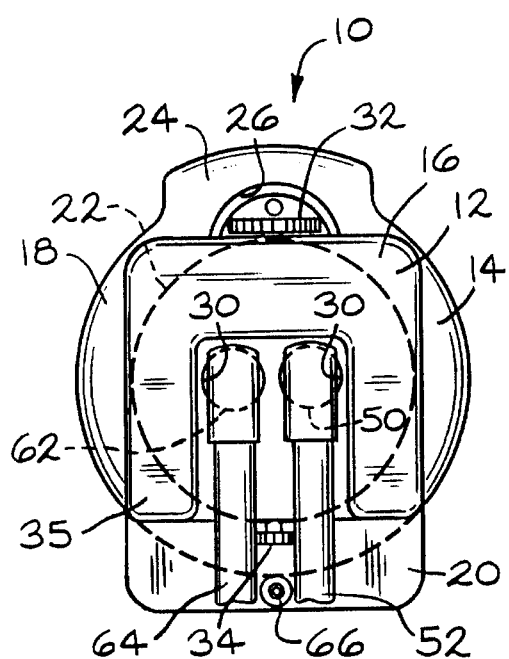
FIG. 5 is a second end view of the measuring device illustrated in FIG. 1, opposite from the end view of FIG. 4.

Preliminarily, it should be noted that certain terms used herein, such as "upper", "lower", "top", "bottom", "distal", "proximal", and "side", are used to facilitate the description of the preferred embodiment of the invention, and are not intended as a limitation on the position in which the device may be used. Indeed, it is contemplated that the device may be easily hand-held in any desired orientation for use.

Referring now to the drawings, there is illustrated in FIGS. 1 through 5 a hand-held gap and contour measuring device 10. The measuring device 10 includes a main body 12 having a distal base 14 and a proximal head 16. As used in this application, the distal portion of the measuring device 10 means the portion of the measuring device 10 which is contemplated to generally be farther away from the viewpoint of an operator during use of the measuring device 10. Similarly, the proximal portion of the measuring device 10 means the portion which will normally be seen by an operator to be the closer of two longitudinally separate portions of the measuring device 10. Thus, it is anticipated that the measuring device 10 will most frequently be held in a manner such that the head 16 is somewhat closer, in the operator's field of view, than the base 14, although it is recognized that the measuring device 10 may be held otherwise for convenience of the operator in a particular situation.

Figure 13:
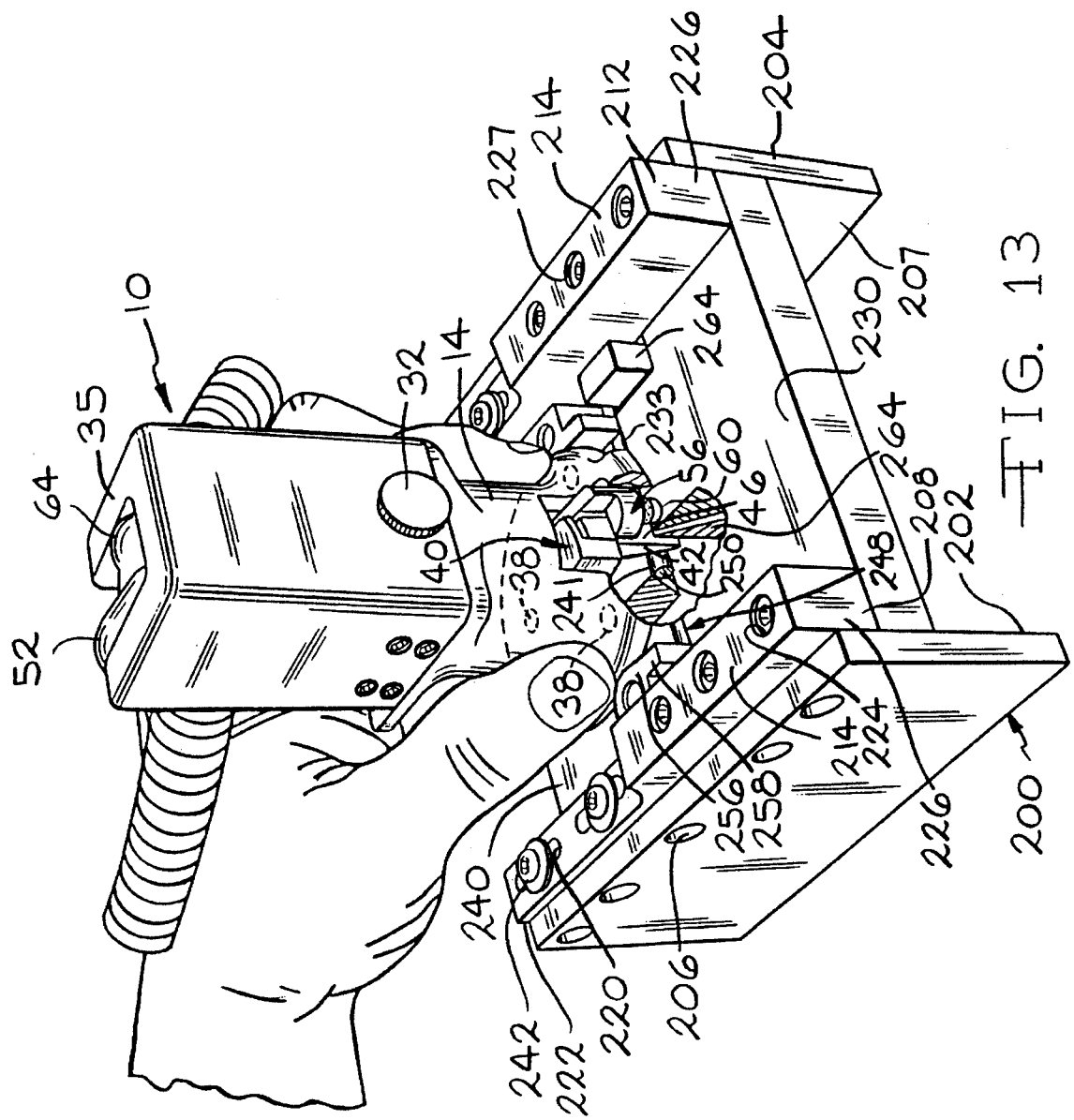
FIG. 13 is a perspective view of a zero block which may be used to prepare the measuring device illustrated in FIG. 1 for taking gap and contour measurements.
Figure 14:
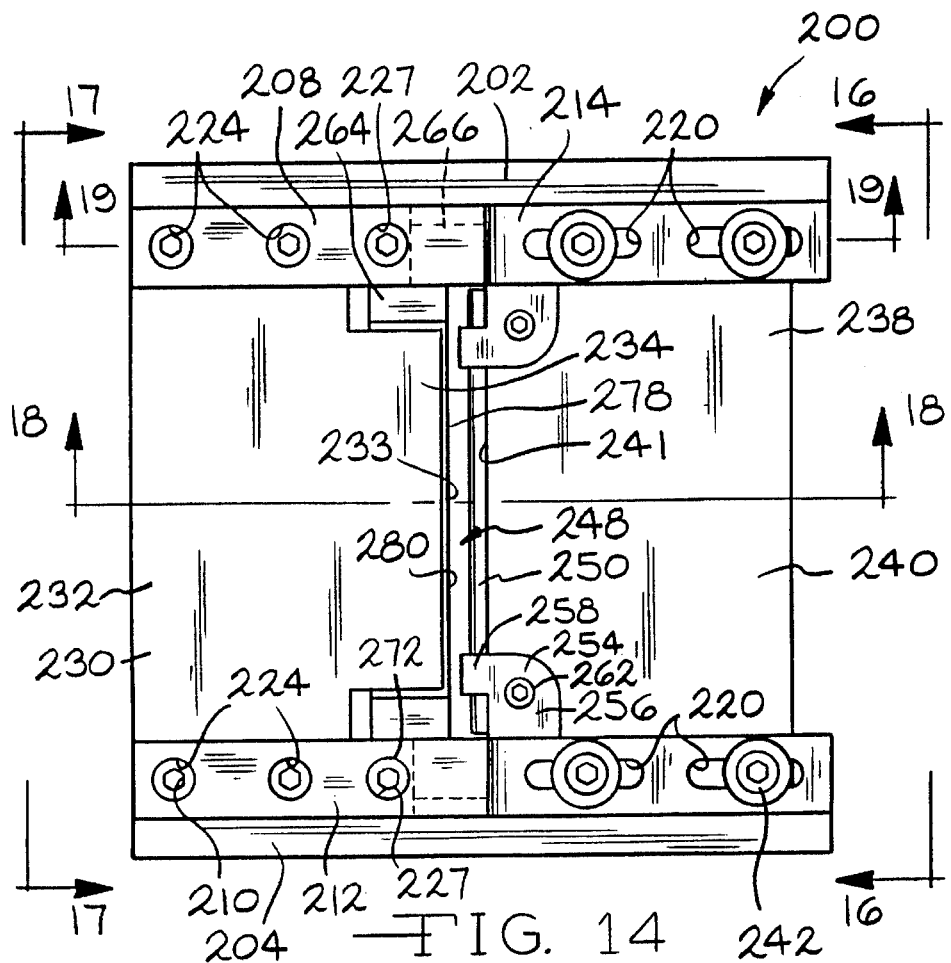
FIG. 14 is a plan view of the zero block illustrated in FIG. 13.
Figure 15:
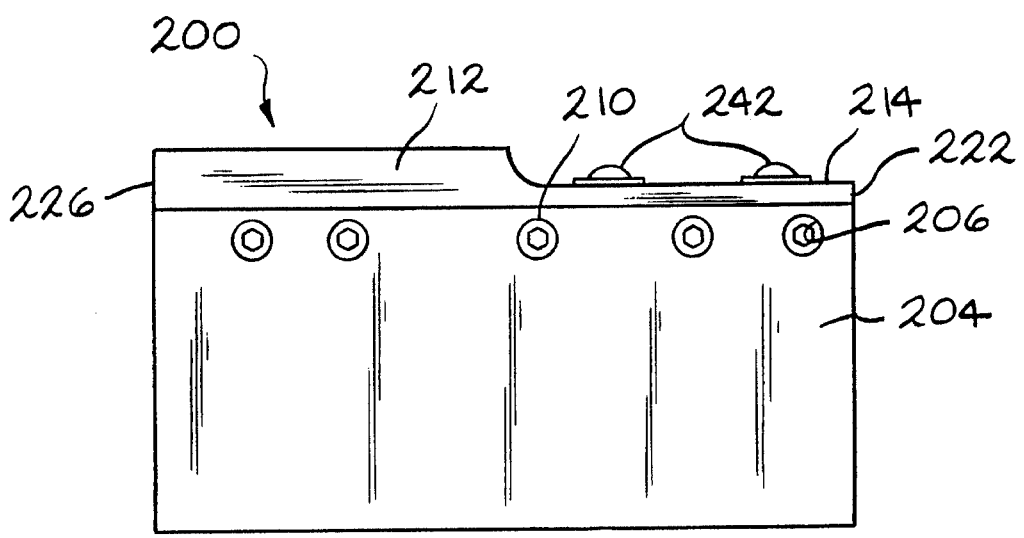
FIG. 15 is a side view of the zero block illustrated in FIG. 13.
Figure 16:
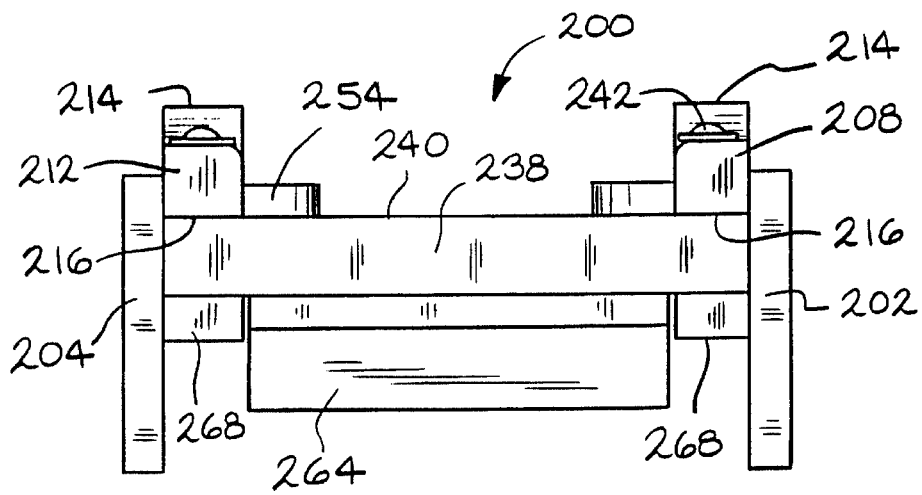
FIG. 16 is a first end view of the zero block taken along the lines 16—16 of FIG. 14.
Figure 17:
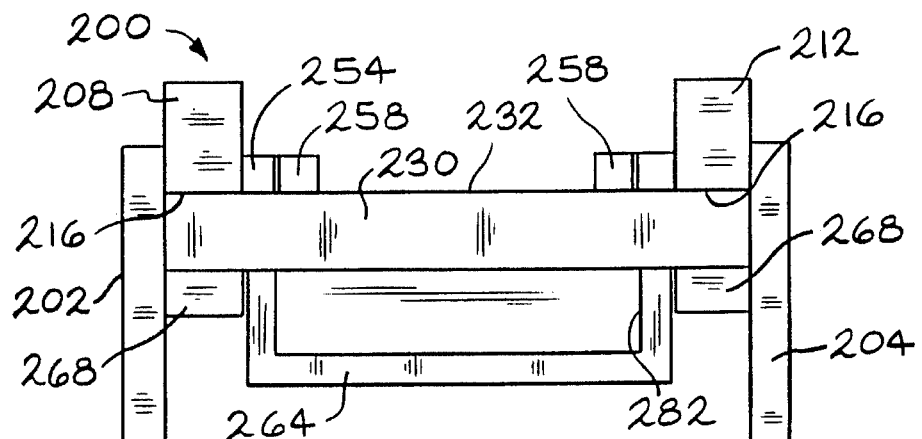
FIG. 17 is a second end view of the zero block taken along the lines 17—17 of FIG. 14.
Figure 18:
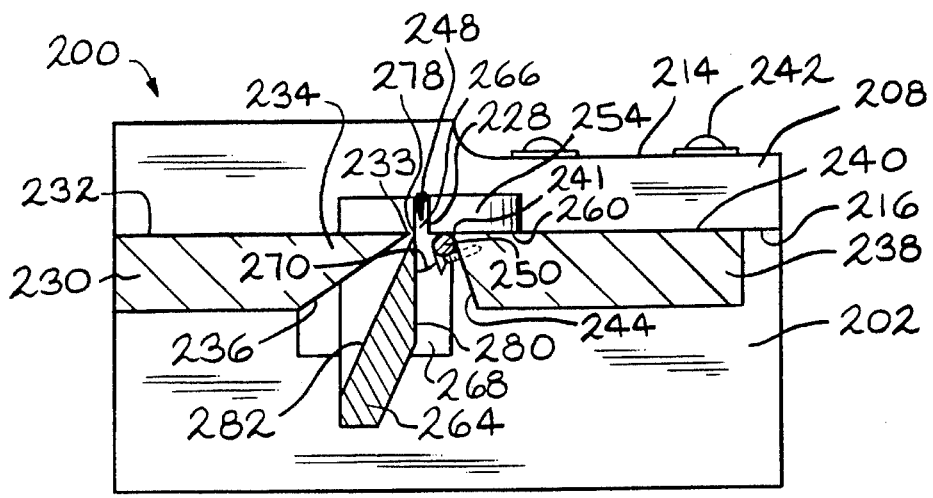
FIG. 18 is a vertical sectional view of the zero block taken along the lines 18—18 of FIG. 14.

The base 14 is suitably formed of a rigid material such as aluminum or stainless steel as a cylindrical body. The base 14 is provided with circumferential distal flange 18 and a rectangular proximal flange 20. Both of the distal flange 18 and the proximal flange 20 extend radially outwardly from the base 14. The cylindrical portion 22 of the base 14 between the distal flange 18 and the proximal flange 20 defines a grip area within which an operator may hold the measuring device 10 with one hand during use of the measuring device 10 (FIG. 13). A bore 23 (FIG. 4) extends longitudinally through the base 14. A radial extension 24 is formed on the distal flange 18. An opening 26 is defined thorough a portion of the cylindrical portion 22 of the base 14 and the distal flange 18 in the region of the radial extension 24 which communicates between the radially outer surface of the base 14 and the bore 23. The purpose of the opening 26 will be explained below.

The head 16 may be suitably formed of aluminum or stainless steel. Two spaced apart longitudinally extending bores 30 are formed through the head 16. The purpose of the bores 30 will be discussed below. A first thumbscrew 32 and a second thumbscrew 34 are threaded into the head 16. The purpose of the thumbscrews 32 and 34 will be discussed below. The proximal end of the head 16 forms an internal, generally U-shaped raised guard 35, the purpose of which will be discussed below.

The main body 12 also includes a reference member 36 disposed partially within the bore 23 through the base 14. A portion of the reference member 36 extends longitudinally out of the distal end of the bore 23. The reference member 36 is secured in the base 14 in a manner which will be described in detail below. Three reference pads 38 are provided on the axial face of the reference member 36. The distal faces of the three reference pads 38 define a plane perpendicular to the longitudinal axis of the main body 12. Typically the reference pads 38 are formed by cap screws fully threaded into the reference member 36. The purpose of the reference pads 38 will be explained below.

A gap measuring element 40 is supported by the main body 12 in a manner which will be further explained below. The gap measuring element 40 is mounted to be reciprocally moveable along a path perpendicular to the plane defined by the three reference pads 38 on the reference member 36. The gap measuring element 40 includes a wedge 42 having a pair of angled contact faces 44 and 46. The wedge 42 of the gap measuring element 40 is mounted on an arm 48. The arm 48 is fixed to the moveable portion of a transducer 50 (FIG. 4) mounted in one of the bores 30. As depicted by the dashed lines in FIG. 4, the wedge 42 can be pivoted on the arm 48 relative to the main body 12 about an axis generally parallel to the path of movement of the gap measuring element 40. A fixed portion of the transducer 50 may be fixed in the bore 30 by, for example, a set screw (not shown).

As will be further describe below, the transducer 50 generates an indication representative of the relative position of the gap measuring element 40 along the path of the gap measuring element 40. In a preferred embodiment, the transducer 50 will generate an electrical signal. However, it is contemplated other indications may be produced by the transducer 50. Thus, as used herein, the word "transducer" should be interpreted to mean any type of device which converts a movement along a path to some type of indication. Thus, for example, a transducer may be a dial micrometer. The transducer 50 may suitably be of the electrical signal producing type described in my co-pending U.S. patent application Ser. No. 08/253,770, the now U.S. Pat. No. 5,473,822, disclosure of which is hereby incorporated by reference. The electrical signal generated by the transducer 50 may be transmitted to a conventional data collection and display circuit (not shown) by an electrical cable 52. The cable 52 is connected to the transducer 50 within the space enclosed by the guard 35 formed on the proximal face of the head 16. Thus the guard 35 helps to protect the connection between the cable 52 and the transducer 50 from accidental damage.

A contour measuring element 56 is also supported by the main body 12. The contour measuring element 56 is mounted to be reciprocally moveable along a path perpendicular to the plane defined by the three reference pads 38 on the reference member 36. The contour measuring element 56 includes a generally L-shaped arm 58 having a longitudinally extending contact tip 60 fixed at one end thereof. The other end of the arm 60 is coupled to a transducer 62 (FIG. 4) to move a moveable portion of the transducer 62 to generate an electrical signal representative of the relative position of the contour element 58 along its path. The transducer 62 is preferably identical to the transducer 50 in structure and operation, and the fixed portion of the transducer 62 may be similarly fixed in a bore 30 by a set screw (not shown). The signal generated by the transducer 62 is transmitted to the data collection and display circuit by an electrical cable 64. The connection between the cable 64 and the transducer 62 is protected by the guard 35.

A cable 66 extends longitudinally out of the outer face of the proximal flange 20, and extends generally beside the head 16. The purpose of the cable 66 will be explained below.

Referring now to FIGS. 6 through 10, it can be seen that the head 16 includes a generally rectangular skirt portion 70. A pair of ribs 72 are formed on the internal surface of a first pair of opposed sides of the skirt portion 70. The ribs 72 reinforce the skirt portion 70 in the areas where the thumbscrews 32 and 33 extend through the skirt portion 70 of the head 16. Additionally, two opposed sets of apertures 74 are formed through the second pair of opposed sides of the skirt portion 70.

As indicated above, each of the transducers 50 and 62 is provided with a respective stationary portion 75, which is fixed within the associated bore 30 through the head 16, and which extends through the space surrounded by the skirt portion 70 of the head 16 and into the hollow base 14. Each of the transducers 50 and 62 is also provided with a moveable portion 76 which is disposed within the hollow base 14, and which may be moved reciprocally, in a telescoping fashion, relative to the associated fixed portion 75. The moveable portions 76 are spring loaded to urge them away from the respective fixed portion 75 of the transducers 50 and 62. Respective threaded fasteners 77 fix the arm 48 to the moveable portion 76 of the transducer 50 and the arm 58 to the moveable portion 76 of the transducer 62.

A pair of linear ball slide bearings 78 are provided, each having a respective first portion 80 and a second portion 82 which is axially moveable relative to the first portion 80. Slide bearings which are believed to be suitable may be obtained from Tusk Direct, Inc. of Bethel, Conn. Each slide bearing 78 is mounted to the inner surface of a respective side of the second pair of opposed sides of the skirt portion 70 of the head 16 by means of fasteners 84 (only one shown) extending through the apertures 74 to engage the associated first portion 80 of the slide bearing 78.

A pair of spaced apart lugs 86 extend axially out of the base 14 into the interior of the space surrounded by the skirt portion 70 of the head 16. Each lug 86 is provided with a recessed area 88 (FIG. 10) to provide clearance relative to the adjacent ribs 72 on the skirt portion 70 of the head 16. The second portion 82 of each slide bearing 78 extends between the lugs 86, and is fixed thereto by fasteners 90 (only 3 shown). Note that the first portion 80 of each slide bearing 78 can be moved relative to the second portion 82 thereof to permit access to the fasteners 90, which extend through the second portions 82 of the slide bearings 78. As illustrated by the dashed lines in FIG. 10, the slide bearings 78 permit the head 16 and the components supported thereby, such as the transducers 50 and 62, to slidably move relative to the base 14 along a path generally perpendicular to the path of movement of the reciprocable moveable portions 76 of the transducers 50 and 62. Simultaneously the slide bearings 78 prevent longitudinal movement of the head 16 relative to the base 14. The thumbscrews 32 and 34 may be advanced into the head 16 to bear against the lugs 86 to prevent sliding movement of the head 16 relative to the base 14. This may be desirable, for example, during measurement of a gap between adjacent assembled parts of an automobile. The thumbscrews 32 and 34 may be retracted outwardly to release the lugs 86 and permit sliding movement of the head 16 relative to the base 14 during use of the measuring device 10.

The reference member 36 includes a cylindrical stationary member 92 disposed within the bore 23 through the base 14. The stationary member 92 is seated against a shoulder 94 (FIGS. 7 and 8) formed on the inner surface of the bore 23, near the proximal end of the bore 23. Fasteners 96 (shown in FIGS. 6 and 8) extend through the wall of the base 14 defining the shoulder 94 to engage the stationary member 92 and fix the stationary member 92 to the shoulder 94. The stationary member 92 has a rectangular opening 98 formed longitudinally therethrough. The transducers 50 and 62 extend through the opening 98.

Figure 7:
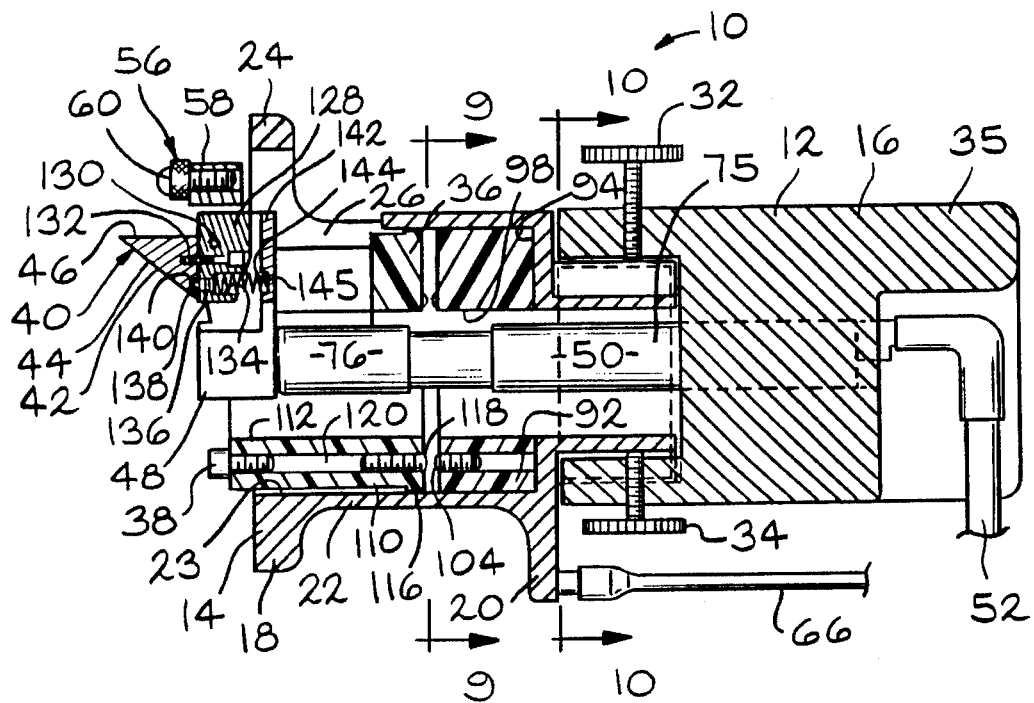
FIG. 7 is view, partly in section, of the measuring device taken along the lines 7—7 of FIG. 4.
Figure 8:
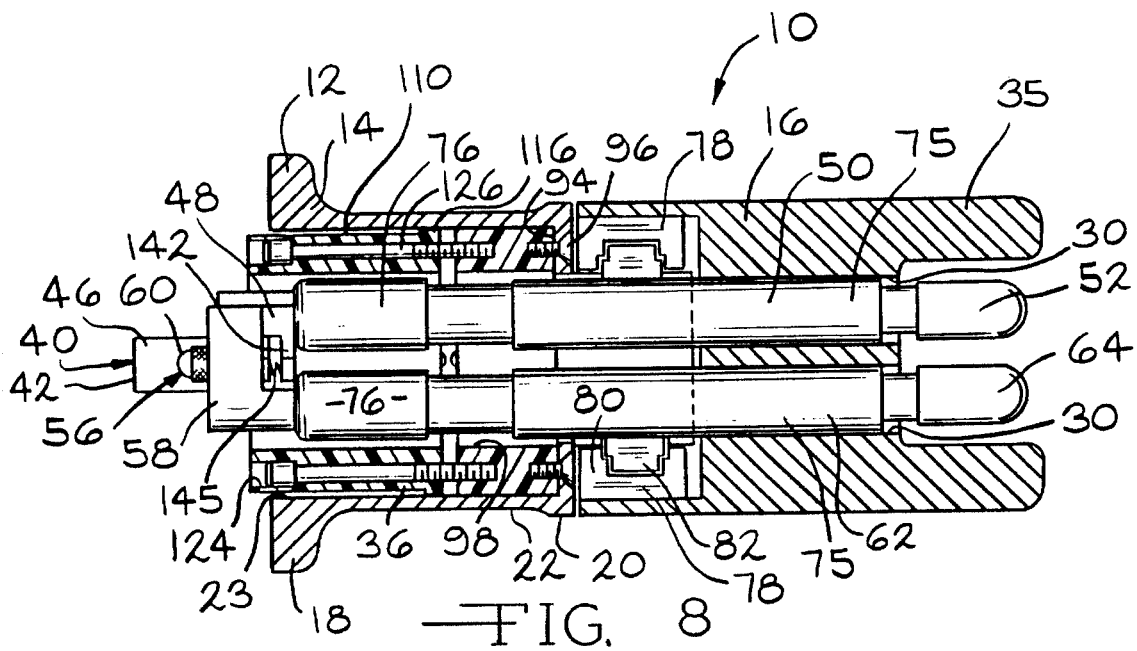
FIG. 8 is view, partly in section, of the measuring device taken along the lines 8—8 of FIG. 4.
Figure 9:
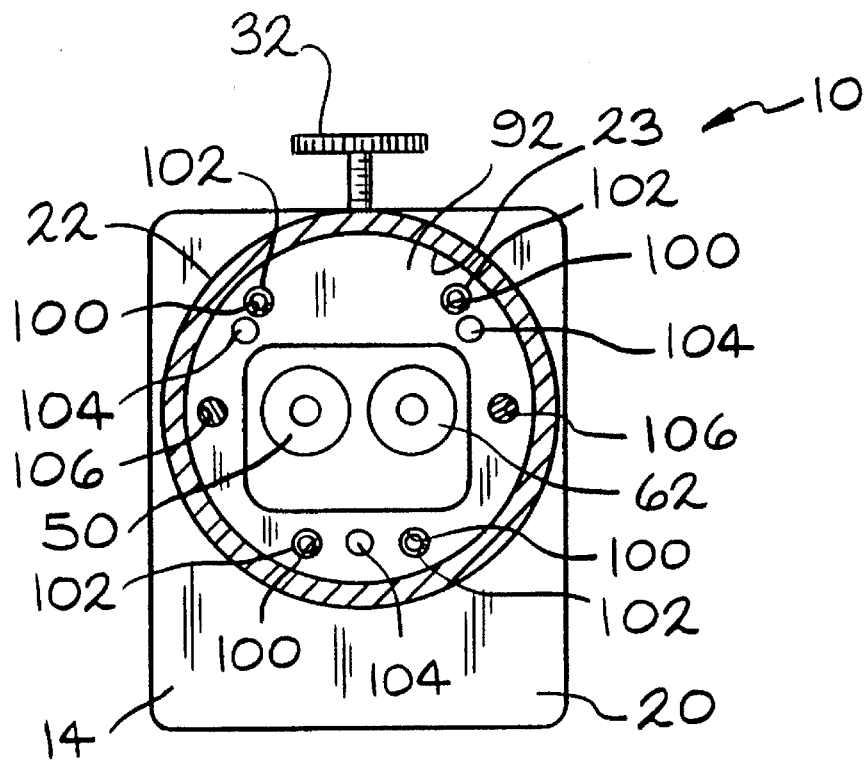
FIG. 9 is vertical sectional view of the measuring device taken along the lines 9—9 of FIG. 7, showing the placement of electrical contacts thereon.
Figure 10:
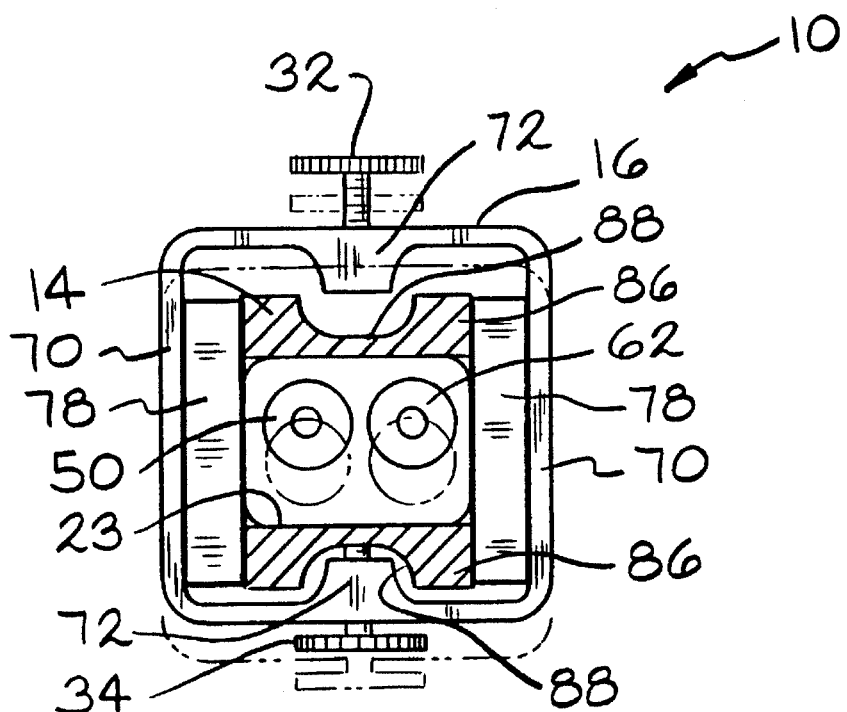
FIG. 10 is vertical sectional view of the measuring device taken along the lines 10—10 of FIG. 7.

As best seen in FIG. 9, four recesses 100 are formed in the distal face of the stationary member 92. Each recess 100 receives one end of a respective compression spring 102. Three equally spaced apart electrical contacts 104 protrude slightly from the distal face of the stationary member 92. As seen in FIG. 7, the electrical contacts 104 may be formed as threaded members disposed in a threaded bore extending axially through the stationary member 92. Connecting wiring (not shown) is provided to connect the electrical contacts 104 to the cable 66 in a manner which will be described below. Finally a pair of threaded recesses 106 are formed on opposite sides of the distal face of the stationary member 92. The purpose of the springs 102, electrical contacts 104, and recesses 106 will be discussed below.

The reference member 36 also includes a cylindrical moveable member 110 slidably disposed within the bore 23 through the base 14. The moveable member 110 is generally cylindrical and has a rectangular opening 112 formed longitudinally therethrough. The transducers 50 and 62 extend through the opening 112. A notch 114, extending into the opening 112, extends longitudinally in one sidewall of the moveable member 110. As will be seen, the notch 114 provides clearance for the contour measuring element 56 and the gap measuring element 40 as they reciprocate along their respective paths. A radially outwardly extending flange 116 is formed on the proximal end of the moveable member 110 which slidably engages the bore 23.

Three electrical contacts 118 protrude slightly from the proximal face of the moveable member 110, each electrical contact 118 being axially aligned with a respective one of the electrical contacts 104 on the stationary member 92. As seen in FIG. 7, the electrical contacts 104 may be formed as threaded members disposed in the proximal end of a respective one of three threaded bores 120 through the moveable member 110. The electrical contacts 104 are electrically interconnected in a manner which will be further explained below. Note that each of the reference pads 38 may be threaded into the distal end of a respective one of the threaded bores 120.

Four recesses (not shown), which are similar to the recesses 100, are formed in the proximal face of the moveable member 110 to receive the distal ends of respective ones of the springs 102. A pair of longitudinal countersunk bores 124 are formed through the moveable member 110. A threaded fastener 126 extends through each of the bores 124 in the moveable member 110 and engages a respective one of the threaded recesses 106 in the stationary member 92. The fastener 126 does not draw the moveable member 110 tight against the stationary member 92. Instead, the springs 102 urge the moveable member 110 away from the stationary member 92 such that there is a relatively small gap between each of the electrical contacts 118 on the moveable member 110 and the associated electrical contact 104 on the stationary member 92. The fasteners 126 limit the size of the gap between the electrical contacts 104 and 122, and retain the moveable member 110 in the bore 23. Preferably each bore 124 is counter sunk sufficiently that the head of the fastener 126 does not extend beyond the distal face of the moveable member 110 when the moveable member 110 is moved to cause the electrical contacts 118 thereon to contact the electrical contacts 104 on the stationary member 92. As will become apparent below, the fasteners 126 should not extend beyond the plane defined by the distal ends of the reference pads 38 when the moveable member 110 is moved toward the stationary member 92 such that the electrical contacts 118 contact the electrical contacts 104 on the stationary member 92. If the heads of the fasteners 126 extend out too far, the range of motion of the moveable member 110 during normal measurement operations could then be so restricted that the electrical contacts 118 thereon may not contact the electrical contacts 104 on the stationary member 92.

Figure 6:
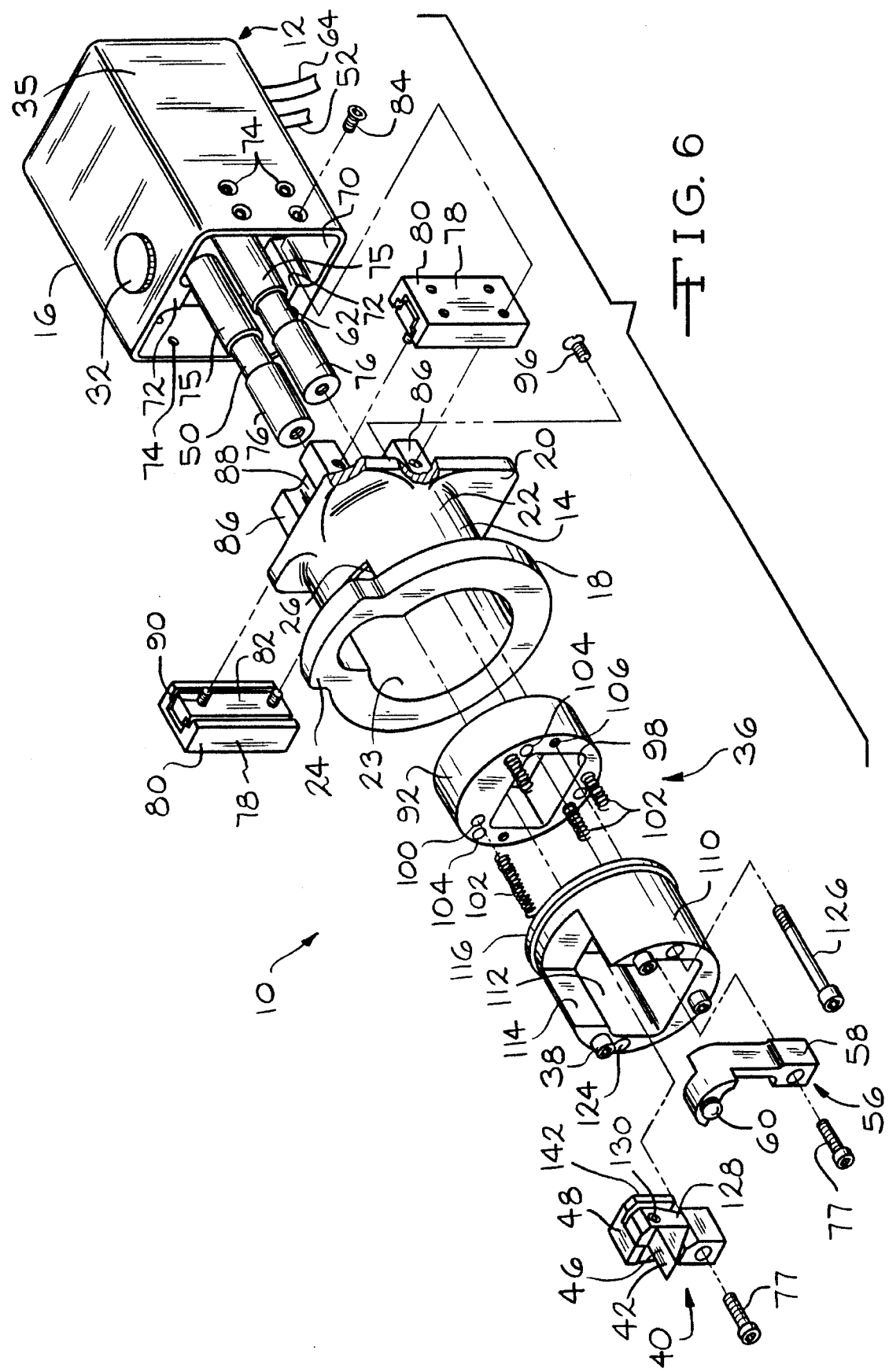
FIG. 6 is an exploded view of the measuring device illustrated in FIG. 1.

As best shown in FIGS. 6 and 7, the wedge 42 is operatively connected to the arm 48 of the gap measuring element 40 by an intermediate arm 128. A pivot pin 130 extends transversely through a bore through the intermediate arm 128 and is threaded into the arm 48. A second pivot pin 132 extends through a longitudinal bore through the intermediate arm 128 and is threaded into the wedge 42 the proximal face of the wedge 42. A second longitudinal bore 134 extending through the intermediate arm 128 is threaded on the distal end thereof. The bore 134 is counter sunk to provide an enlarged unthreaded proximal portion.

A threaded member 136 is disposed partially in the threaded distal end of the bore 134. The distal end 138 of the threaded member 136 extends into an arcuate groove 140 formed in the proximal face of the wedge 42. The groove 140 in the wedge 42 permits the wedge 42 to pivot about the pivot pin 132 as depicted by the dashed lines in FIG. 4, passing above the distal end 138 of the threaded member 136. However, the degree of pivotal freedom that the wedge 42 enjoys is limited by the distal end 138 of the threaded member 136 contacting the ends of the arcuate groove 140. Additionally, the pivot pin 132 may be tightened to lock the wedge 42 in a desired orientation relative to the intermediate arm 128.

The intermediate arm 128 may be pivoted about the pivot pin 130, thereby permitting the wedge 42 to tilt relative to the reference member 36. The pivot pin 130 may be tightened to prevent the intermediate arm 128 from moving relative to the arm 48, and locking the wedge 42 at a desired angle of flit. A flange 142 extends inwardly from the arm 48 adjacent the intermediate arm 128. Beyond a certain amount of flit, the intermediate arm 128, on one side or the other of the pivot pin 130, will bear against the flange 142, limiting the amount that the wedge 42 can be tilted. Therefore, while the wedge 42 can be both pivoted and tilted, the degree of freedom of tilt and pivot are both limited. Typically, the maximum tilt of the wedge 42 to be allowed is on the order of about 30 degrees. Thus, the wedge 42 will always pivot about an axis generally parallel (within about 30 degrees) to the path traveled by the gap measuring element 40, even when tilted somewhat.

A recess 144 is formed in the distal side of the flange 142. The recess 144 is generally longitudinally aligned with the bore 134 in the intermediate arm 128. A spring 145 is seated in the recess 144 and in the bore 134 to urge the intermediate arm 128 to rotate clockwise from the position illustrated in FIG. 7. Thus the spring 145 acts to urge the wedge 42 to tilt radially outwardly relative to the longitudinal centerline of the measuring device 10.

Figure 11:
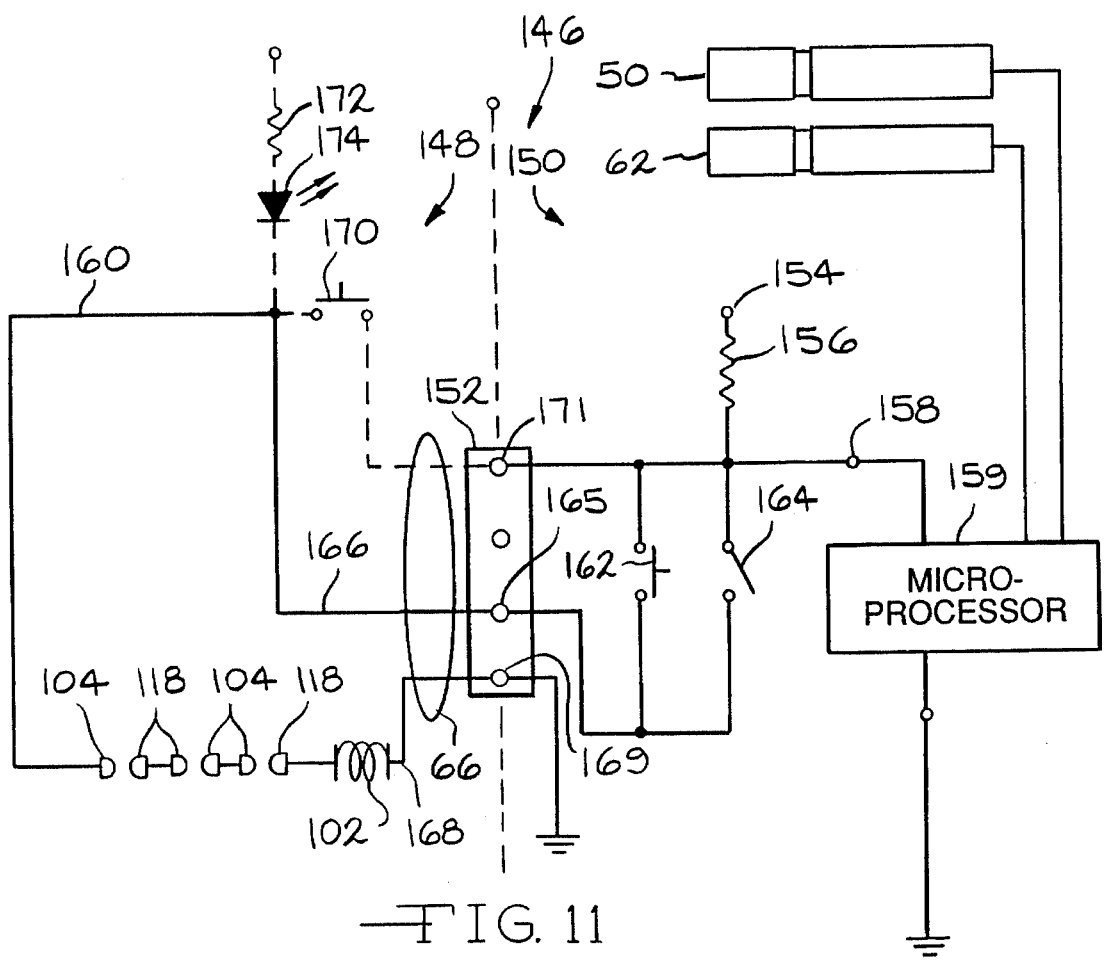
FIG. 11 is a schematic illustration of the electrical circuit containing the electrical contacts illustrated in FIG. 9.

FIG. 11 shows one possible arrangement of the electrical contacts 104 and 118 in a detecting circuit 146. As shown therein, the detecting circuit 146 is generally divided between a portion, generally indicated at 148, which is contained in or mounted on the measuring device 10, and a portion, generally indicated at 150, which is contained in a data collection and display device. The two portions 148 and 150 of the detecting circuit 146 are interconnected as shown by a multiple conductor jack 152. Voltage is applied to the detecting circuit 146 at a terminal 154 within the portion 150 thereof. A dropping resistor 156 is connected to the terminal 154. The output of the dropping resistor 156 is supplied via a terminal 158 to a microprocessor 159 controlling the reading and storing of the electrical signals produced by the transducers 50 and 62. Of course, while the device controlling the reading and storing of the electrical signals is described as a microprocessor, those of ordinary skill in the art will recognize that other devices, particularly electronic switching devices, may be used instead. When the voltage is high at the terminal 158, the microprocessor 159 does not record the signals from the transducers 50 and 62. A low voltage at the terminal 158 is a signal to the microprocessor 159 to record the signals from the transducers 50 and 62.

The detecting circuit 146 provides a circuit path 160 in parallel to the output to the microprocessor 159. A normally open manual record switch 162 and an auto-manual toggle switch 164 are connected in parallel between the terminal 158 and a pin 165 of the jack 152. The pin 165 is connected to a conductor 166 contained within the cable 66. The conductor 166 is electrically connected to a first one of the electrical contacts 104 in the stationary member 92. The circuit path 160 extends through to the associated electrical contact 118 on the moveable member 110, and thence to another of the electrical contacts 118, a second and a third electrical contact 104, and then to the third electrical contact 118 on the moveable member 110. One of the springs 102 is connected in the circuit between the third electrical contact 118 and a conductor 168. The other end of the conductor 168 is connected, through the cable 66 and a pin 169 of the jack 152, to electrical ground. The circuit path 160 is thus defined parallel to the output to the microprocessor 159.

When the measuring device 10 is positioned to take measurements of gap and contour, it is important that the measuring device 10 be held perpendicular to the surface of the part being measured in order to provide accurate, repeatable measurements. The reference pads 38 on the moveable member 110 contact the surface of the part to be measure, and orient the reference member 110 perpendicular to the surface. When the measuring device 10 is pressed perpendicularly against the surface, compressing the springs 102, each associated pair of electrical contacts 104 and 118 on the stationary member 92 and the moveable member 110, respectively, are in contact with one another, providing an uninterrupted current path within that portion of the circuit path 160. If the measuring device 10 is chanted when pressed against the surface of the part to be measured, the bore 22 through the base 14 will be tilted relative to the moveable member 110, and thus the moveable member 110 and the stationary member 92 will contact at an angle. This will prevent all of the associated pairs of electrical contacts 104 and 118 from contacting one another, and the current path in that portion of the circuit path 160 will be interrupted until the head 16 and base 14 are moved to bring the stationary member 92 into alignment with the moveable member 110. Note that the spring 102 which forms an uninterrupted part of the circuit path 160, regardless of the relative positions of the moveable member 110 and the stationary member 92.

If the auto-manual toggle switch 164 is in the auto (closed) position thereof, contact between all three pairs of electrical contacts 104 and 118 will complete the circuit path 160 to pull the voltage low at the terminal 158, signaling the microprocessor 159 to record the signals from the transducers 50 and 62. If the auto-manual toggle switch 164 is in the manual (open) position thereof, the manual record switch 162 must be closed to pull the voltage low on the terminal 156. As indicated by the dashed line in FIG. 11, a second manual record switch 170, wired in parallel to the manual record switch 162 through a pin 171 of the jack 152 and physically located on the measuring device 10, can be used to provide a remote means of signaling the microprocessor 159 to record the signal output of the transducers 50 and 62 once the electrical contacts 104 and 118 are all closed.

The sub-circuit 160 preferably additionally contains a resistor 172 and a light-emitting diode (LED) 174 connected in series between a terminal 176 and the conductor 166, and physically located on the measuring device 10. With a voltage (of the same polarity and magnitude as that applied to the terminal 154) applied to the terminal 176, the LED 174 will illuminate when each pair of electrical contacts 104 and 118 are closed regardless of the positions of the auto manual toggle switch 164 or the manual record switches 162 and 170. Illumination of the LED 174 is an indication to the operator that the measuring device 10 is properly held perpendicular to the surface of the part being measured, that all the electrical contacts 104 and 118 are closed, and that the signals output of the transducers 50 and 62 may be read and recorded (manually or automatically).

Figure 12:
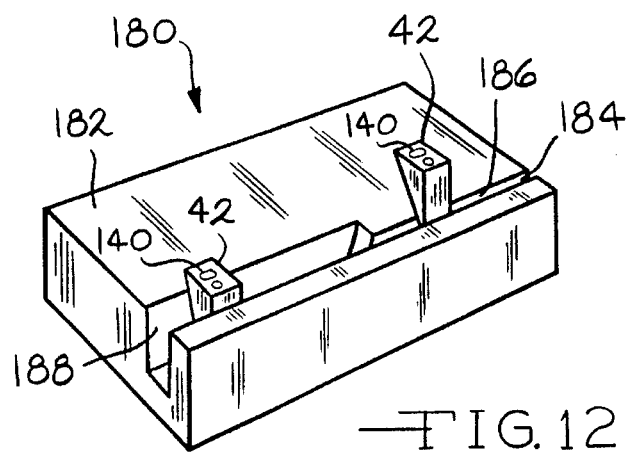
FIG. 12 is an illustration of a calibration block which may be used with the measuring device according to the invention.

FIG. 12 illustrates a typical calibration block 180 to be used with the gap measuring element 40. The calibration block 180 has a flat upper surface 182. A linear notch 184 is formed in the surface 182. The notch 184 includes a relatively narrow portion 186, and a relatively wide portion 188, each of precisely known widths.

To calibrate the gap measuring element 40 of the measuring device 10, the measuring device 10 is positioned with the wedge 42 of the gap measuring element 40 positioned as shown in the narrow portion 186 of the notch 184. The contact face 46 of the wedge 42 is positioned perpendicular to the surface 182 of the calibration block 180. When the reference member 36 is in contact with the surface 182 and all of the associated pairs of electrical contacts 104 and 118 are in contact, a reading is taken of the output of the transducer 50. The signal output of the transducer 50 is modified by the operator using a calibration circuit (not shown) until the reading of the output of the transducer 50 indicates the known width of the narrow portion 186 of the notch 184. For example, if the notch were 2 millimeters wide, the signal output of the transducer would be modified until an indication of 2 millimeters was obtained.

The wedge 42 is then positioned as shown in the wide portion 188 of the notch 184. Note that because the gap being measured is wider than in the narrow portion 186 of the notch 184, the wedge 42 will be positioned lower relative to the surface 182 of the calibration block 180. Thus the moveable portion 76 of the transducer 50 will be extended further from the fixed portion 75 thereof than the moveable portion 76 was when the wedge 42 was positioned in the narrow portion 186 of the notch 184, casing a proportional change in the signal produced by the transducer 50. When the reference member 36 is in contact with the surface 182 and all of the associated pairs of electrical contacts 104 and 118 are in contact, another reading is taken of the output of the transducer 50. The gain on the signal output of the transducer 50 is then modified by the operator until the reading of the output of the transducer 50 indicates the known width of the wide portion 188 of the notch 184. Preferably, the measuring device 10 is then repositioned in the narrow portion 186 of the notch 184 to verify that the reading of the output of the transducer still indicates the known width of the narrow portion 186.

The contour measuring element 56 is calibrated by moving the moveable portion 76 of the transducer 62 between the full in and full out positions thereof. The transducer 62 has a precisely known length of stroke for the moveable portion 76 thereof. The operator changes the calibration circuit (not shown) to adjust the gain applied to the signal produced by the transducer 62 to cause the total indicated change in reading between the full in position and full out position of the moveable portion 76 of the transducer 62 to match the known length of stroke thereof. The calibration circuit may also be adjusted to cause the reading of the output of the transducer 62 to read zero when the moveable portion 76 is fully extended, or when the measuring device is fully seated on a flat surface, such as the surface 182 of the calibration block 180, or at any other convenient point in the range of travel of the moveable portion 76.

FIG. 13 illustrates the measuring device 10 in operative position on a zero block 200 of this invention. As shown in FIGS. 13 through 21, the zero block includes a pair of spaced apart upstanding side walls 202 and 204. A plurality of counter sunk apertures 206 are formed along the upper marginal edge of each side wall 202 and 204. Each side wall 202 and 204 has an inner face 207 facing the other side wall 204 or 202. An elongate, horizontally extending, support member 208 is secured to the upper marginal edge of the inner face 207 of the side wall 202 by fasteners 210 extending through the apertures 206 and engaging the support member 208. Similarly, an elongate, horizontally extending, support member 212 is secured to the upper marginal edge of the inner face 207 of the side wall 204 by the fasteners 210 extending through the apertures 206 through the side wall 204, and engaging the support member 202.

Each of the support members 208 and 2 12 is rectangular in longitudinal cross-section and has an upper surface 214 and a lower surface 216. A pair of longitudinally extending slots 220 are formed in a first end 222 of each support member 208 and 212, extending from the upper surface 214 to the lower surface 216 thereof. A pair of vertical bores 224 are formed through a second end 226 of each support member 208 and 212. A third vertical bore 227 is formed between the slots 220 and the bores 224. The lower surface 216 of each support member 208 and 212 is precision machined or ground to a desired degree of flatness. A semi-circular transverse notch 228 is formed in the lower surface 216 of each of the support members 208 and 212.

A horizontal fixed plate 230 extends between the sidewalls 202 and 204. The fixed plate 230 has an upper surface 232 which is precision machined or ground to a desired degree of flatness and which is provided with an inwardly facing linear marginal edge 233. The fixed plate 230 is fixed to the support members 208 and 212 by fasteners 210 extending through the vertical bores 224 to engage the fixed plate 230. The fasteners 210 hold the upper surface 232 of the fixed plate 230 against the lower surfaces 216 of the support members 208 and 212. An inwardly extending tongue 234 is formed on the fixed plate 230. An inwardly facing edge surface 236 (best seen in FIGS. 18, 20 and 21) of the tongue 234 forms an acute angle to the upper surface 232 of the fixed plate 230, for a purpose which will be explained below.

A horizontal moveable plate 238 extends between the sidewalls 202 and 204. The moveable plate 238 has an upper surface 240 which is precision machined or ground to a desired degree of flatness, and has an inwardly facing linear marginal edge 241 parallel to the marginal edge 233 of the fixed plate 230. The moveable plate 238 is supported on the support members 208 and 2 12 by fasteners 242 extending through the slots 220 to engage the moveable plate 238. The fasteners 242 may be selectively tightened to hold the upper surface 240 of the moveable plate 238 against the lower surfaces 2 16 of the support members 208 and 212 and prevent relative movement therebetween. The fasteners 242 may be loosened to permit horizontal movement of the moveable plate 238 relative to the support members 208 and 212. The range of motion of the moveable plate 238 is limited by the length of the slots 220. An inwardly facing edge surface 244 (best seen in FIGS. 18, 20 and 21) of the moveable plate 238 forms an acute angle to the upper surface 240 thereof along the marginal edge 241, for a purpose which will be explained below. Normally it is expected that the marginal edge 241 of the moveable plate 238 will be spaced apart from the marginal edge 233 of the fixed plate 230 to form a gap 248 therebetween. The moveable plate 238 may be moved relative to the fixed plate 230 to vary the gap 248 therebetween.

A replaceable rod 250 may be attached to the surface 244 along the marginal edge 241. The rod 250 is captured between a pair of screws 252 threaded into the surface 244, and a pair of retaining members 254 fixed to the upper surface 240 of the moveable plate 238. Each screw 252 and the adjacent retaining member 254 should contact diametrically opposed points of the rod 250 to avoid applying a torque to the rod 250.

The retaining members 254 each have a body 256 with an outwardly extending arm 258. The lower surface 260 of each retaining member 254 is machined to a desired degree of flatness, and bears against the upper surface 240 of the moveable plate 238 and the upper surface of the rod 250. Each body 256 is fixed to the moveable plate 238 by a fastener 262. Thus the arm 258 of each retaining member 254 holds the rod 250 level with the upper surface 240 of the moveable plate 238. The rod 250 cooperates with the upper surface 240 of the moveable plate 238 to define an edge radius. As shown in FIGS. 20 and 21, the rod 250 may be replaced with a selected other rod 250' to define another edge radius, different from that defined by the rod 250. Thus, by replacing the rod 250 with a rod 250' having a different diameter from the rod 250, the zero block 200 can reproduce any edge radius of a part, within the selected design limits of the zero block 200.

An adjustable plate 264 is rotatably supported by the support members 208 and 212. The adjustable plate 264 includes a pair of outwardly extending tunnions 266. The tunnions 266 are rotatably supported within the notches 228 in the respective lower surfaces 216 of the support members 208 and 212 by a respective trunnion support block 268.

Each trunnion support block 268 is provided with a notch 270 in the upper surface thereof which cooperates with the respective adjacent notch 228 in the lower surfaces 216 of the associated support member 208 or 212 to define a generally cylindrical surface for rotatably retaining the associated trunnion 266. The notch 270 is somewhat shallower than a full semi-circle, and as a result, a gap 271 is formed between each trunnion support block 268 and the adjacent lower surface 216 of the associated support member 208 or 212. Each trunnion support block 268 is fixed to the lower surface 216 of a respective one of the support members 208 and 212 by a fastener 272 passing through the associated vertical bore 227. A threaded member 274 disposed in a threaded bore of the trunnion support block 268 and in contact with the associated support member 208 to form a fulcrum point. The fastener 272 engages the trunnion support block 268 between the threaded member 274 and the respective trunnion 266. When the fastener 272 is tightened or loosened, the trunnion support block 268 pivots about the fulcrum formed by the threaded member 274 to cause the tunnions 266 to be respectively more tightly or loosely held between the trunnion support block 268 and the support member 208 or 2 12. The fastener 272, in conjunction with the threaded member 274, thereby regulates the ease with which the adjustable plate 264 may be rotated relative to the fixed plate 230. The fastener 272 can be tightened sufficiently to hold the adjustable plate 264 firmly in place relative to the fixed plate 230. Additionally, each trunnion support block 268 is provided with a respective set screw 276 which can be advanced within a threaded bore through the trunnion support block 268 to engage the associated trunnion 266 to provide an additional means for fixing the position of the adjustable plate 264

The centerline of each trunnion 266 is aligned with the marginal edge 278 of a flat surface 280 on the adjustable plate 264. Additionally, the centerline of each tunnions 266 lies within the plane defined by the lower surface 216 of the support members 208 and 2 12, and thus the upper surfaces 232 and 240 of the fixed plate 230 and the adjustable plate 238, respectively. Thus as the adjustable plate 264 is rotated, the marginal edge 278 remains collinear with the centerlines of the tunnions 266, and level with the upper surfaces 232 and 240 of the fixed plate 230 and the adjustable plate 238, respectively.

It should be noted that when the rod 250 or 250' are secured along the marginal edge 241 of the moveable plate, the gap 248 will be defined (and thus measured between) the marginal edge 278 of the adjustable plate 238 and the rod 250 or 250'. If the rod 250 or 250' is removed, the gap 248 will be understood to be defined between the marginal edge 278 and the marginal edge 241 of the moveable plate 238. Finally, if no adjustable plate 264 is provided in the zero block 200, the gap 248 will be understood to be defined between the marginal edge 233 of the fixed plate 230 and either the marginal edge 241 of the moveable plate 238 or the rod 250 or 250' if installed on the moveable plate 238.

As best seen in FIG. 21, a relieved area 282 is defined in the side of the adjustable plate 238 opposite to the flat surface 280. The relieved area 282, together with the angled inner edge surface 236 of the adjacent tongue 234 on the fixed plate 230, permit the adjustable plate 238 to be rotated to a position in which the flat surface 280 forms an angle of about 75 degrees to the upper surface 232 of the fixed plate 230. Similarly, the angled inner edge surface 244 on the moveable plate 238 provides relief to allow the adjustable plate 238 to be rotated in the opposite direction, causing the flat surface 280 to form an angle of about 120 degrees to the upper surface 232 of the fixed plate 230. Thus the zero block 200 may be set up to simulate a variety of angled gaps between parts or between a part and a fixture.

In use, the zero block 200 is set up to simulate the nominal dimensions expected to be measured. For example, for simulating measuring a gap between two parts, the rod 250 installed in the zero block 200 will be selected to simulate the nominal radius of a first part. The moveable plate 238 will be moved away from the adjustable plate 264 so that the gap between the rod 250 and the flat surface 280 of the adjustable plate 264 is the desired (nominal) gap. The adjustable plate 264 is normally locked in position with the flat surface 280 perpendicular to the upper surface 232 of the fixed plate 30. The wedge 42 of the measuring device 10 will normally be locked with the contact surface 46 thereof extending perpendicularly to the plane defined by the reference pads 38. Thus, when the reference pads 38 engage the moveable plate 238, as illustrated in FIG. 20, the contact surface will be perpendicular to the surface of fixed plate 230. Therefore, there is no need to simulate the radius of the edge of the other part, and the contact surface 46 will engage the flat surface 280 of the moveable plate 238.

Following calibration, as described above, the measuring device 10 is positioned to read the gap and contour of the zero block 200, as shown in FIG. 20 and as will be further described below. Since zero block 200 simulates the nominal geometry of parts to be measured, the readings produced by the transducers 50 and 62 will be those which exist when the parts are in their desired configuration. If, during measurement of actual parts, the readings differ from those produced by reading the zero block 200, then the operator will recognize that the geometry of the parts is different from the nominal geometry. The magnitude of the difference will reflect how far from the nominal geometry the parts are.

Setting up the zero block 200 to simulate the geometry between a part and fixture is similar. However, since the edge of a fixture is normally a sharp edge, rather than a radiused edge, the rod 250 is removed, and the marginal edge 24 1 of the moveable plate 238 between the upper surface 240 and the inner edge surface 244 is used to represent the edge of the fixture. Note that since the contact face 44 of the wedge 42 will only contact the upper edge of the fixture surface facing the part, any difference between the angle of the surface 244 to the upper surface 240 of the moveable plate 238 and the actual geometry of the fixture is immaterial.

The adjustable plate 264 is set to form an angle between the flat surface 280 thereof and the upper surface 232 of the fixed plate 230 which reflects the nominal geometry of the part relative to the fixture. When placing the measuring device 10 on the zero block 200 in this configuration, the wedge 42 is allowed to tilt so that the contact face 46 thereof lies flush against the flat surface 280 of the zero block 200. With the contact face 44 of the wedge contacting the adjacent marginal edge 241 of the moveable plate 238, the readings produced by the measuring device 10 will reflect the desired readings when the actual part is in the nominal geometry relative to the actual fixture.

FIGS. 22 through 25 schematically illustrate the process of using the measuring device 10 to measure a gap between the spaced apart opposed surfaces 286 and the contour between the adjacent outwardly facing surfaces 288 of two parts 290 and 292. The parts 290 and 292 may, for example, be a door and a door post of an automobile. However, it will be recognized that the parts 290 and 292 may be any other pair of adjacent parts, or even adjacent portions of the same part. In such a situation, as indicated above, it will normally be desirable to tighten the pivot pin 130 to prevent the wedge 42 from tilting, and lock the wedge 42 in place with the contact face 46 thereof perpendicular to the plane defined by the reference pads 38. However the wedge 42 will normally be left free to pivot about the pivot pin 132. The thumbscrews 32 and 34 will normally be tightened inwardly, to hold the head 16 in a fixed position relative to the base 14.

Figure 22:
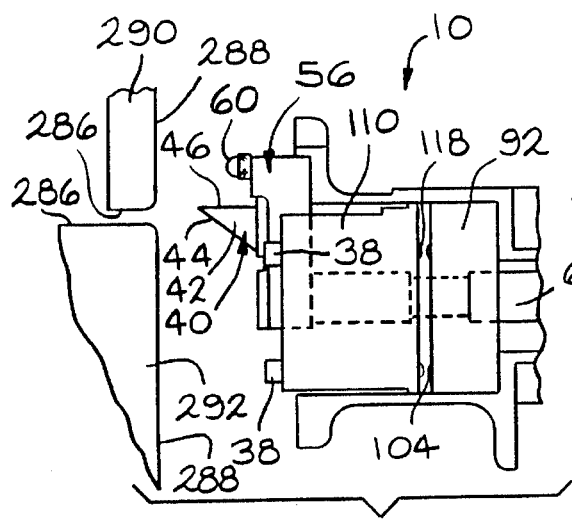
FIG. 22 is a partial side schematic view of the measuring device preparatory to being positioned to take gap and contour readings of two parts.
Figure 23:
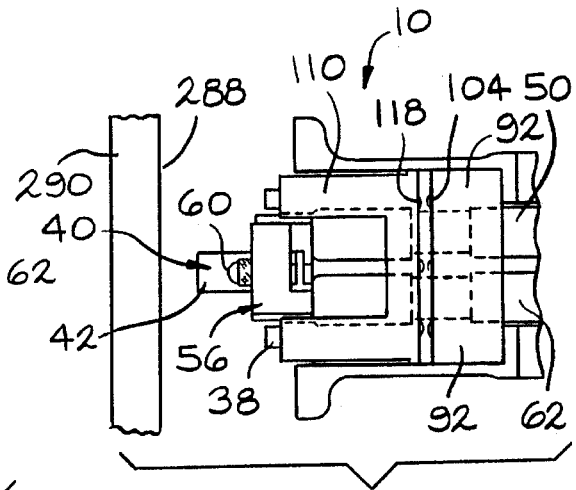
FIG. 23 is a partial top schematic view of the measuring device preparatory to being positioned to take gap and contour readings of the two parts illustrated in FIG. 22.
Figure 24:
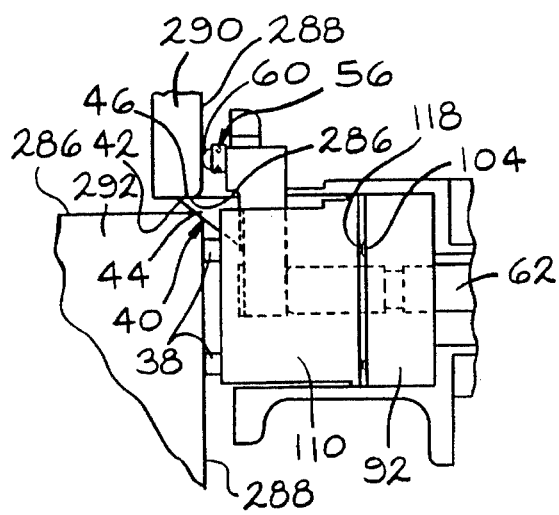
FIG. 24 is a partial side schematic view of the measuring device positioned to take gap and contour readings of the two parts illustrated in FIG. 22.
Figure 25:
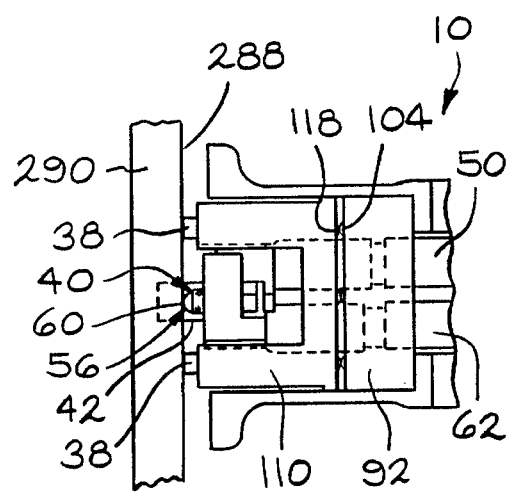
FIG. 25 is a partial top schematic view of the measuring device positioned to take gap and contour readings of the two parts illustrated in FIG. 22.

As shown in FIGS. 22 and 23, the springs 102 will normally move the moveable member 110 away from the stationary member 92, breaking the contact between the electrical contacts 104 and 118. When the measuring device 10 is positioned to take gap and contour measurements of the parts 290 and 292, the reference member 36 is pressed against the surface 288 of the part 292, causing the springs 102 to be compressed, and the moveable member 110 to contact the stationary member 92. Holding the measuring device 10 with the longitudinal axis thereof perpendicular to the surface 288 of the part 292 causes the electrical contacts 104 to contact the electrical contacts 118, as shown in FIGS. 24 and 25.

As the measuring device 10 is pressed against the surface 288 of the part 292, the gap measuring element 40 is inserted into the gap and contacts the parts 290 and 292, and the contour measuring element 56 contacts the part 290. This causes the gap measuring element 40 and contour measuring element 56 to be pressed into the base 14. The notch 114 in the moveable member 110 of the reference member 36, the radial extension 24 on the distal flange 20 of the base 14 and the opening 26 through the cylindrical portion 22 of the base 14 cooperate to provide relieved areas into which the gap measuring element 40 and contour measuring element 56 can be moved.

The measuring device 10 is positioned so that the contact faces 44 and 46 contact the adjacent edges of the surfaces 286 of the parts 290 and 292. Thus the gap measuring element 40 will be moved from a fully extended position to a position somewhere between fully extended and fully retracted. The output of the transducer 50 indicates the size of the gap.

Simultaneously with taking the measurement of the gap between the parts 290 and 292, the contact tip 60 is positioned against the surface 288 of the part 290, causing the contour measuring element 56 to partially retract from a fully extended position. The output of the transducer 62 indicates the flushness or lack thereof of the two parts 290 and 292. The outputs of the transducers 50 and 62 may be simultaneously read and recorded by the microprocessor 159.

Figure 26:
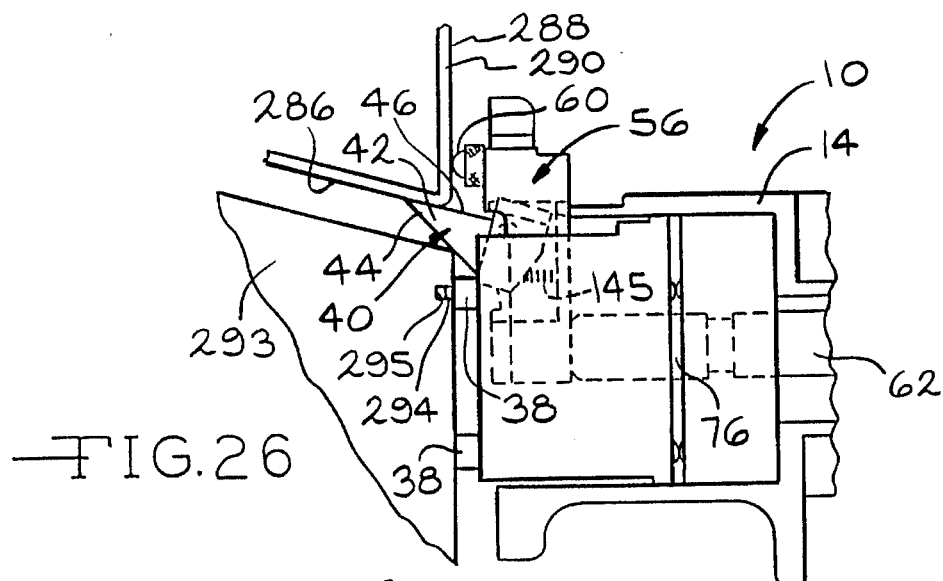
FIG. 26 is a partial side view of the measuring device positioned to take gap and contour readings of two parts having opposed facing surfaces extending at an angle to the outwardly facing surfaces of the parts.
Figure 27:
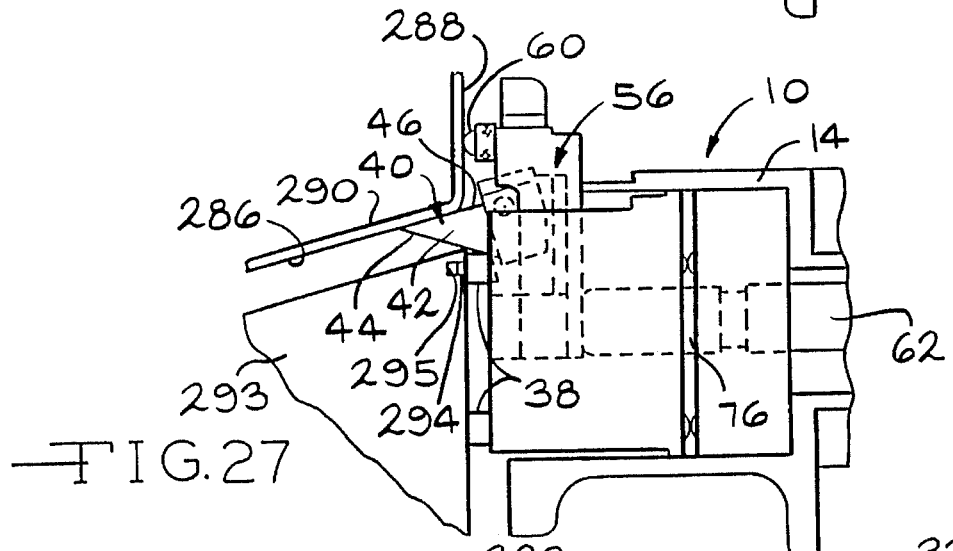
FIG. 27 is a view similar to that of FIG. 26, except the opposed facing surfaces of the parts extend at a different angle to the outwardly facing surfaces of the parts.

Taking gap and contour measurements between a fixture 293 and the part 290 is similar to taking measurements between the parts 290 and 292. As shown in FIGS. 26 and 27, it may be desirable to increase the repeatability of the measurements taken by providing two reference pads 38 which have been modified to form a head 294 thereon. The modified reference pads 38 are substituted for two modified reference pads. The head 294 of each modified reference pad 38 is fitted into a respective locating recess 295 formed into the fixture 293. Providing locating recesses 295 on the fixture 293 helps ensure that different operators will take gap and contour measurement readings from exactly the same point on the fixture 293.

When taking gap measurements between the fixture 293 and the part 290 when the gap therebetween extends at other than a right angle to the outwardly facing surface 288 of the part 290, the wedge 42 is allowed to tilt under the influence of the spring 145. The thumbscrews 32 and 34 are retracted partially out of the head 16, out of contact with the base 14, thereby allowing the head 16 to move transversely to the base 14.

Figure 28:
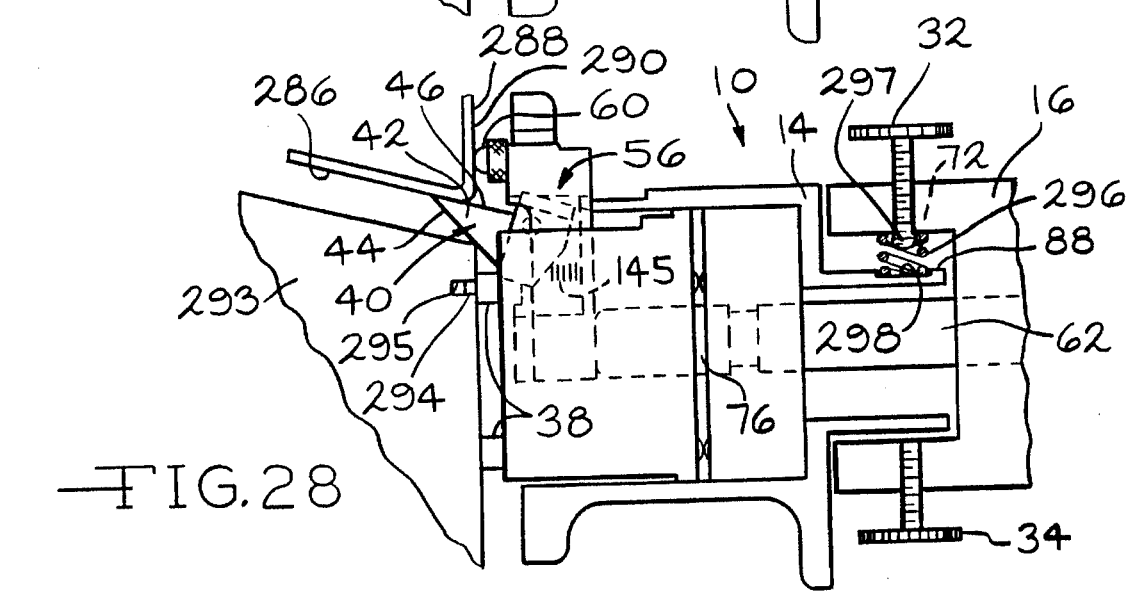
FIG. 28 is a view similar to that of FIGS. 26 and 27 showing a spring which may be added to bias the head portion of the measuring device transversely relative to the base portion of the measuring device.

It is believed that in some applications if the head 16 is allowed to freely move transversely to the base 14, the downward urging of the spring-loaded moveable portion 76 of the transducer 50 will cooperate with the rotational urging of the spring 145 to align the wedge 42 in a position where the contact face 46 of the wedge 42 will be flush against the surface 286 of the part 290 and the contact face 44 of the wedge 42 will engage the edge of the fixture 293. However, it also thought that in most applications it will be necessary and desirable to provide an additional spring 296 to act between the head 16 and the base 14 as shown in FIG. 28. Preferably the spring 296 is a coil spring oriented transversely in the measuring device 10.

During assembly of the measuring device 10, after the thumbscrew 32 is threaded into the head 16 and the inner end thereof extends out of the associated rib 72, the inner end of the thumbscrew 32 is upset or peened over to form an enlarged head 297. The radially outer end of the spring 296 is disposed about the head 297 on the inner end of the thumbscrew 32 and bears against the head 16. A recessed spring seat 298 is formed on the base 14, within the recessed area 88, and the radially inner end of the spring 296 is seated therein. Thus, the spring 296 is disposed to urge the head 16, and the components supported thereby, toward the part 290. The radially outer end of the spring 296 is retained in position by the head 297 on the thumbscrew 32. The radially inner end of the spring 296 is retained in position by the recessed spring seat 298 on the base 14. Note that when the thumbscrew 32 is advanced into the head 16, the head 297 of the thumbscrew 32 advances along the centerline of the spring 296, inside the coils thereof, to contact the base 14.

When the wedge 42 contacts the surface 286 of the part 290, the wedge 42 will pivot, slightly compressing the spring 145, until the contact face 46 lies flat against the surface 286 of the part 290. Simultaneously, the spring-loaded moveable portion 76 of the transducer 50 will urge the wedge 42 into the gap between the part 290 and the fixture 293, until the contact face 44 of the wedge 42 contacts the edge of the fixture 293.

The reference member 36 ensures the main body 12 of the measuring device 10 is oriented properly relative to the fixture 293. The transducer 50 provides a signal representative of the position of the gap measuring element 40 along the path thereof. The wedge 42 can tilt or be locked into position to ensure the contact face 46 consistently contacts the part 290 and the contact face 44 consistently contacts the part 292 or the fixture 293 in the same orientation. Thus the reference member 36, the transducer 50 and the wedge 42 cooperate to ensure the measuring device 10 can take accurate and repeatable gap measurement readings between the part 290 and the part 292 or the fixture 293 for a wide range of angles of the surface 286 to the surface 288 of the part 290. Additionally, the contour measuring element 56 can simultaneously measure the contour variance between the outwardly facing surface 288 of the part 292 or the fixture 293 and the outwardly facing surface 288 of the part 290.

FIGS. 29, 30, and 31 illustrate another embodiment of a measuring device according to this invention and indicated generally at 300. The measuring device 300 is provided with a housing 302 having a convenient pistol grip 304. A pair of spaced apart bores 306 (FIG. 30) are formed longitudinally through the housing 302.

Three spaced apart reference pads 307 are fixed to the housing 302 to form a reference member, and define a plane perpendicular to the bores 306.

A respective transducer 308 is fixed in each of the bores 306, each similar to the transducers 50 and 62 discussed above. One of the transducers 308 is provided with a wedge 310. The wedge 310 is fixed to the associated transducer 308, and can neither tilt nor pivot in the illustrated embodiment. The angled contact surfaces 3 12 and 314 form a line extending transversely to the housing 302. The wedge 310, together with the associated transducer 308, constitute a gap measuring element.

A contour measuring element is formed of the other transducer 308 and a contact element 316 fixed thereto. The contact element 316 is provided with a bifurcated arm 318 defining a linear contact edge extending perpendicularly to the line formed by the contact surfaces 3 12 and 314 of the wedge 310. Thus while the wedge 310 is inserted into a gap between parts, with the reference pads 307 engaging a first part, the contact element 316 extends perpendicularly to the gap, and engages the other of the two parts.

The relative movement of each of the transducers 308 provides an indication of the size of the gap or contour between the two parts, as discussed above for the gap measuring element 40 and the contour measuring element 56.

Although not illustrated herein, it is contemplated that the fixed plate 230 or the moveable plate 238 of the zero block 200 can be made pivotal or vertically moveable relative to the other of the movable plate 238 and the fixed plate 230, thereby permitting simulation of different contours of parts relative to one another or relative to a fixture. Additionally, although the measuring devices 10 and 300 are described as being hand-held, it is specifically contemplated that the measuring devices 10 and 300 may be temporarily or permanently mounted to a fixture, robotic arm, or other structure for taking gap and contour measurements therewith.

In accordance with the provisions of the patent statutes, the principle and mode of operation of the present invention have been explained and illustrated in the preferred embodiment, however, it will be understood that the present invention may be practiced otherwise than as specifically explained and illustrated without departing from its spirit or scope.

What is claimed is:

1. A device for simultaneously measuring a gap between spaced apart opposed surfaces and a contour between adjacent outwardly facing surfaces of a first part and a second part, comprising:

a main body;

a gap measuring element supported relative to said main body and movable along a first path relative to a first reference member carried by said main body, said first reference member being selectively engagable with one of the first and second parts, said gap measuring element insertable into the gap for engagement with both of the first and second parts, said gap measuring element coupled to a first transducer for generating a first signal representative of the relative position of said gap measuring element along said first path and proportional to the gap between the opposed surfaces; and a contour measuring element supported relative to said main body and movable along a second path relative to a second reference member carried by said main body, said second reference member being selectively engagable with the outwardly facing surface of one of the first and second parts, said contour measuring element engagable with the outwardly facing surface of the other of the first and second parts, said contour measuring element coupled to a second transducer for generating a second signal representative of the relative position of said contour measuring element along said second path and proportional to the contour of the adjacent outwardly facing surfaces.

2. The device of claim 1 wherein said gap measuring element includes a wedge having a pair of angled surfaces, said wedge being insertable into the gap for engagement of each of said angled surfaces with a respective one of the opposed surfaces, said wedge being movable along said first path relative to said first reference member.

3. The device of claim 2 wherein said second reference member is combined with said first reference member to form a unitary reference member.

4. The device of claim 3 wherein said first and second paths are parallel linear paths, and wherein said main body includes a base which carries said unitary reference member and a head which carries said wedge, said contour measuring element, and said first and second transducers, and wherein said head is slidably mounted relative to said base along an axis generally perpendicular to said paths.

5. The device of claim 3 wherein said unitary reference member includes a plurality of spaced apart reference pads for engagement with the outwardly facing surface of the one of the first and second parts for stabilizing said main body relative to the one of the first and second parts.

6. The device of claim 5 including means for generating a signal when all of said reference pads are in engagement with the outwardly facing surface of the one of the first and second parts.

7. The device of claim 2 wherein said first path is a linear path, and wherein said wedge is pivotable about an axis parallel to said first path.

8. The device of claim 2 wherein said first path is a linear path, and wherein said wedge is tiltable about an axis perpendicular to said first path.

9. The device of claim 1 wherein said main body is adapted to be hand-held by an operator to hold said first reference member in engagement with the one of the first and second parts.

10. A device for measuring a gap between the spaced apart opposed surfaces of two parts comprising:

a main body having a reference member engagable with an outwardly facing surface of one of the parts; and a tapered body supported relative to said main body and having a pair of angled surfaces, said tapered body insertable into the gap for engagement of each of said angled surfaces with a respective one of the opposed surfaces, said tapered body being movable relative to said reference member along a predetermined path, said tapered body being tiltable about an axis perpendicular to said path, said tapered body being coupled to a transducer for generating a signal representative of the relative position of said tapered body along said path, said signal being indicative of the magnitude of the gap between the opposed surfaces.

11. The device of claim 10 wherein said path is a linear path, and wherein said main body includes a base which carries said reference member, said tapered body, and said transducer, and wherein said tapered body is movable relative to said base along an axis generally perpendicular to said path.

12. The device of claim 10 wherein said first reference member includes a plurality of spaced apart pads for engagement with the outwardly facing surface of the one part for stabilizing said main body relative to the one part.

13. The device of claim 12 including an indicator for automatically generating a signal when all of said pads are in engagement with the outwardly facing surface of the one part.

14. The device of claim 10 wherein said path is a linear path, and wherein said tapered body is pivotable about an axis parallel to said path.

15. The device of claim 10 wherein said tapered body is a wedge having a pair of mutually inclined planar surfaces.

16. The device of claim 10 wherein said main body is adapted to be hand-held by an operator to hold said reference member in engagement with said one part.

17. The device of claim 15 wherein said tapered body is pivotable about an axis parallel to said path.

18. The device of claim 10 including an intermediate member coupling said main body and said tapered body to permit movement of said tapered body relative to said reference member along a second path perpendicular to said predetermined path, whereby said tapered body can be inserted into the gap between the two parts with said reference member positioned at one of a plurality of distances from the gap.

19. The device of claim 18 wherein said intermediate member is a head slidably mounted upon said base.

20. A device for measuring a gap between spaced apart opposed surfaces of a first part and a second part, comprising:

a main body;

a gap measuring element supported relative to said main body and insertable into the gap for engagement with at least one of the first and second parts, said gap measuring element mounted to be movable along a path relative to a reference member carried by said main body and engagable with the other of the first and second parts, said gap measuring element coupled to a transducer for generating a signal representative of the relative position of said element along said path and proportional to the gap between the facing surfaces; and an electrical indicator for automatically indicating when said reference member is in engagement with one of the first and second parts.

21. The device of claim 20 wherein said indicator comprises at least one electrical switch in an electrical circuit, which switch changes state when said reference member engages the one of the first and second parts.

22. A device for measuring a contour between adjacent outwardly facing surfaces of a first part and a second part, comprising:

a main body;

a contour measuring element supported relative to said main body and engagable with the outwardly facing surface of one of the first and second parts, said contour measuring element mounted to be movable along a path relative to a reference member carried by said main body and engagable with the outwardly facing surface of the other of the first and second parts, said contour measuring element coupled to a transducer for generating a signal representative of the relative position of said element along said path and proportional to the contour of the adjacent outwardly facing surfaces; and an electrical indicator for automatically indicating when said reference member is in engagement with one of the first and second parts.

23. The device of claim 22 wherein said indicator comprises at least one electrical switch in an electrical circuit, which switch changes state when said reference member engages the one of the first and second parts.

24. A gap measuring device including:
a body;
a gap measuring element movable along a path relative to said body and operatively connected to said body, said gap measuring element having a pair of mutually inclined contact surfaces, one of said contact surfaces being parallel to said path; and
a transducer producing a signal indicative of the displacement of said gap measuring element along said path relative to said body.

25. The gap measuring device of claim 24 wherein said gap measuring element can pivot about said path relative to said body.

26. The gap measuring device of claim 24 wherein said gap measuring element is pivotable about an axis perpendicular to said path such that said one of said contact surfaces can be moved from a position parallel to said path to a position at an angle to said path.

* * * * *